(12) United States Patent  (10) Patent No.: US 8,496,361 B2
Watanabe et al.  (45) Date of Patent: Jul. 30, 2013

(54) ILLUMINATION DEVICE INCLUDING LIGHT SOURCE, LIGHT DIFFUSER AND LIGHT SHIELD, AND MANUFACTURING METHOD THEREOF

(75) Inventors: Masamichi Watanabe, Kawasaki (JP); Ryo Hattori, Kawasaki (JP); Hidekatsu Kobayashi, Kawasaki (JP); Shoh Tsuchiya, Gotenba (JP); Nariyasu Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 12/878,245

(22) Filed: Sep. 9, 2010

(65) Prior Publication Data

US 2011/0228554 A1  Sep. 22, 2011

(30) Foreign Application Priority Data

Sep. 10, 2009 (JP) ................. 2009-209328

(51) Int. Cl.
*F21V 3/00* (2006.01)
*F21V 5/00* (2006.01)
*F21V 1/14* (2006.01)

(52) U.S. Cl.
USPC .............. 362/311.14; 362/330; 362/351

(58) Field of Classification Search
USPC .............. 362/330, 311.11, 456, 30, 307, 308, 362/327, 311.14, 351, 360, 558–560
See application file for complete search history.

(56) References Cited

U.S. PATENT DOCUMENTS

| 3,257,748 | A | * | 6/1966 | Hardesty ..................... 362/30 |
| 4,443,835 | A | * | 4/1984 | Brautigam et al. ........... 362/300 |
| 4,965,950 | A | * | 10/1990 | Yamada ..................... 40/546 |
| 5,247,429 | A | * | 9/1993 | Iwase et al. ................. 362/30 |
| 5,408,060 | A | * | 4/1995 | Muurinen ................... 200/314 |
| 5,839,823 | A | * | 11/1998 | Hou et al. ................... 362/327 |
| 6,079,844 | A | * | 6/2000 | Whitehead et al. ......... 362/97.4 |
| 6,435,690 | B1 | | 8/2002 | Till |
| 6,814,456 | B1 | * | 11/2004 | Huang et al. ............... 362/30 |
| 6,827,456 | B2 | * | 12/2004 | Parker et al. ............... 362/629 |

FOREIGN PATENT DOCUMENTS

| JP | 2002-125016 | 4/2002 |
| JP | 2002-352658 | 12/2002 |
| JP | 2008-199212 | 8/2008 |

OTHER PUBLICATIONS

Japanese Office Action mailed May 21, 2013 for corresponding Japanese Application No. 2009-209328, with English-language translation.

* cited by examiner

*Primary Examiner* — Alan Cariaso
(74) *Attorney, Agent, or Firm* — Fujitsu Patent Center

(57) ABSTRACT

An illumination unit including: a light source; a light guide-diffuser that guides and diffuses source light from the light source; a selective translucent unit that reflects external light or reduces the transmission of external light, while also transmitting light guided from the light guide-diffuser; and a presentation surface that presents the source light that has been guided from the light guide-diffuser and transmitted through the selective translucent unit.

9 Claims, 43 Drawing Sheets

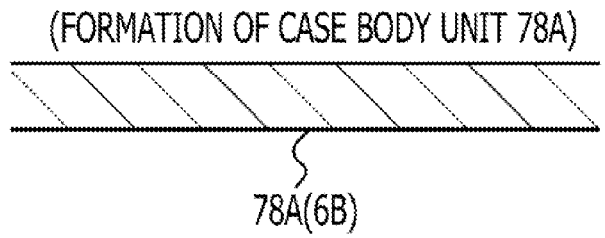
FIG. 22A (FORMATION OF CASE BODY UNIT 78A)
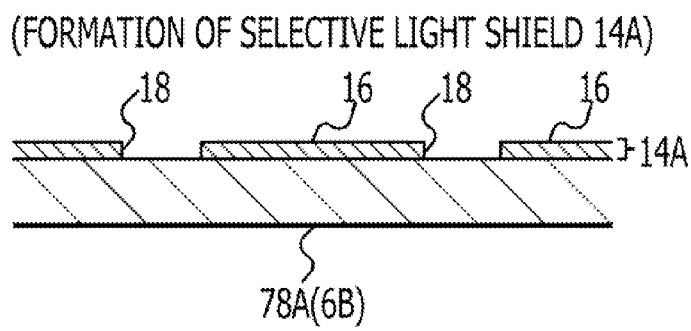
FIG. 22B (FORMATION OF SELECTIVE LIGHT SHIELD 14A)
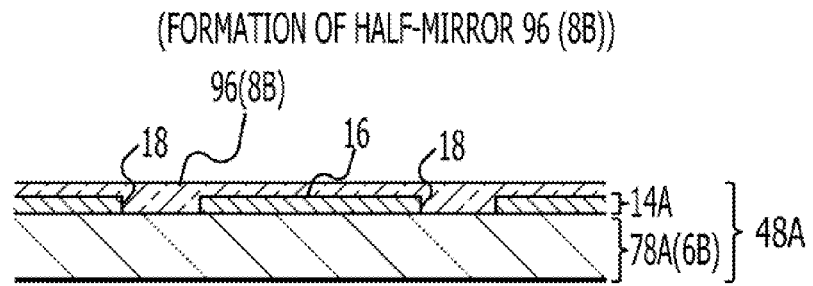
FIG. 22C (FORMATION OF HALF-MIRROR 96 (8B))
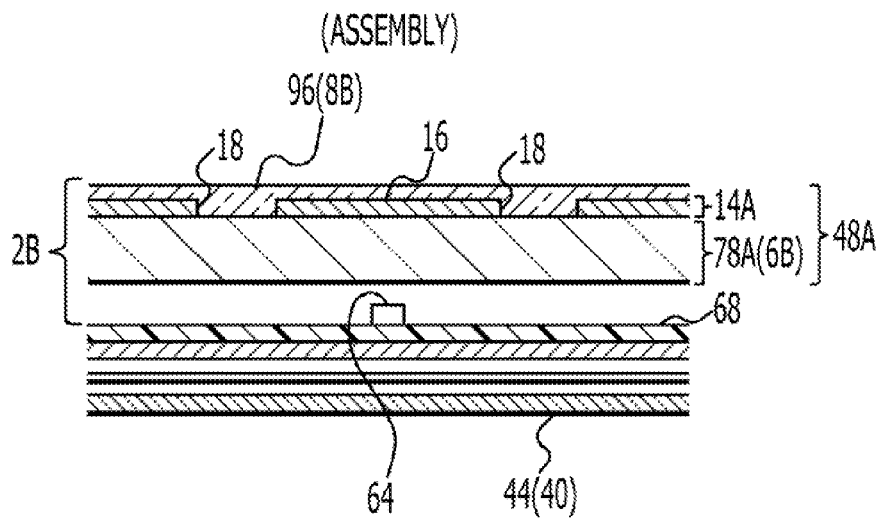
FIG. 22D (ASSEMBLY)

(FORMATION OF CASE BODY UNIT 78B)

78B(6A)

(FORMATION OF HALF-MIRROR 138 (8A))

(ASSEMBLY)

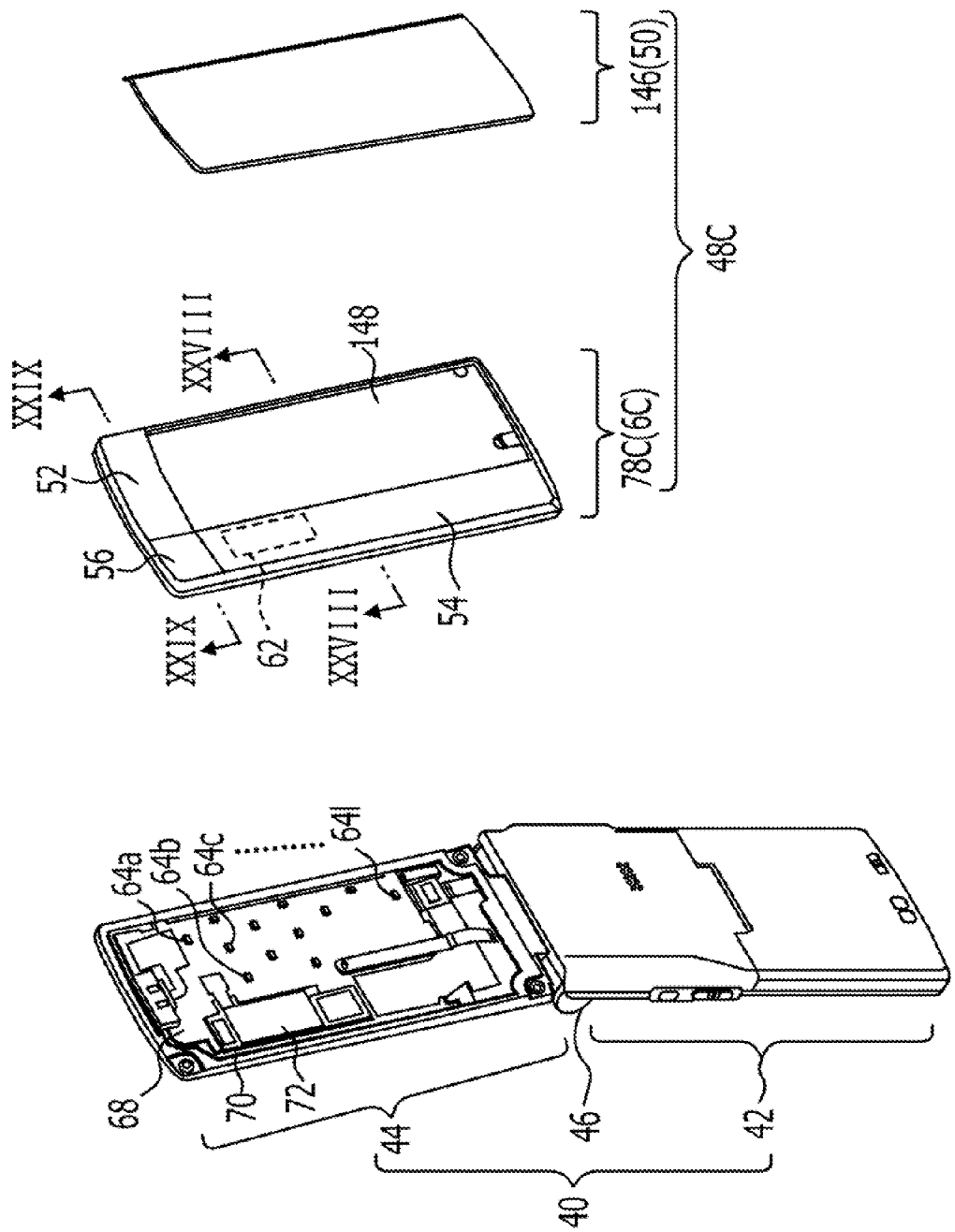

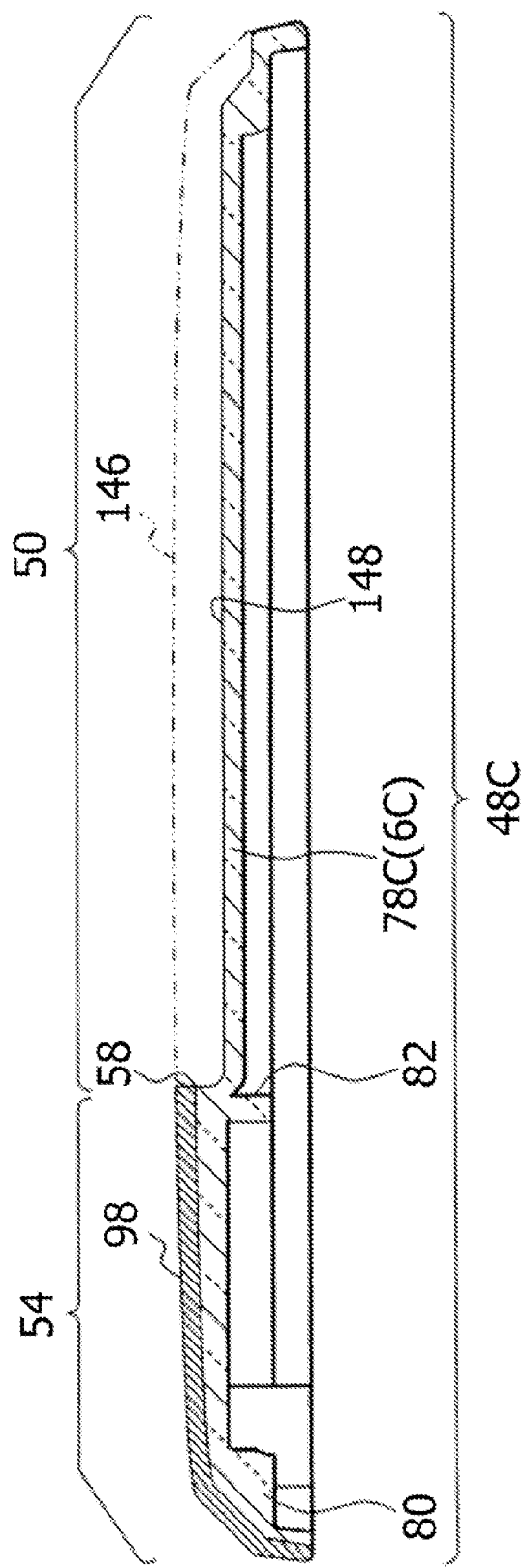

FIG. 37A (FORMATION OF CASE BODY UNIT 78C)
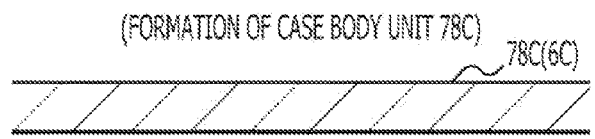
FIG. 37B (FORMATION OF SELECTIVE LIGHT SHIELD 14A)
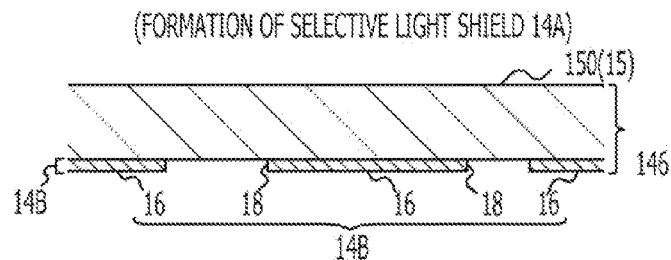
FIG. 37C (FORMATION OF HALF-MIRROR 152 (8C))
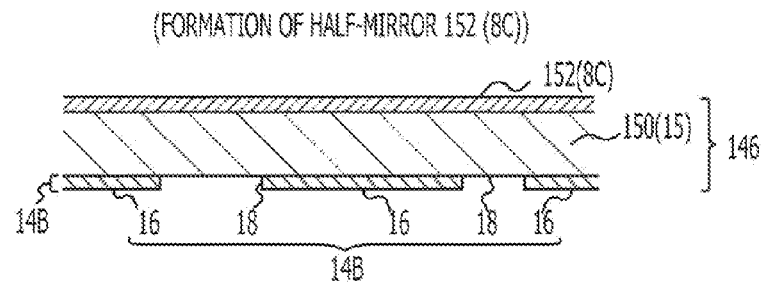
FIG. 37D (FORM CASE UNIT 48C)
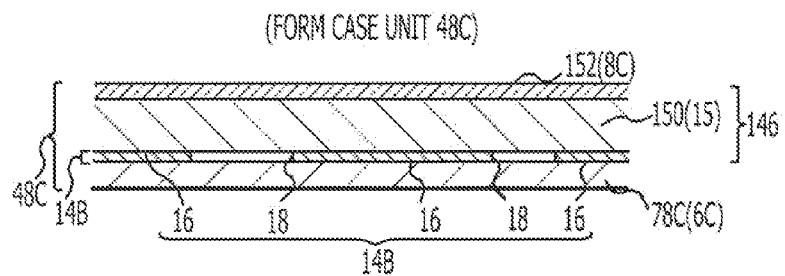
FIG. 37E (ASSEMBLY)
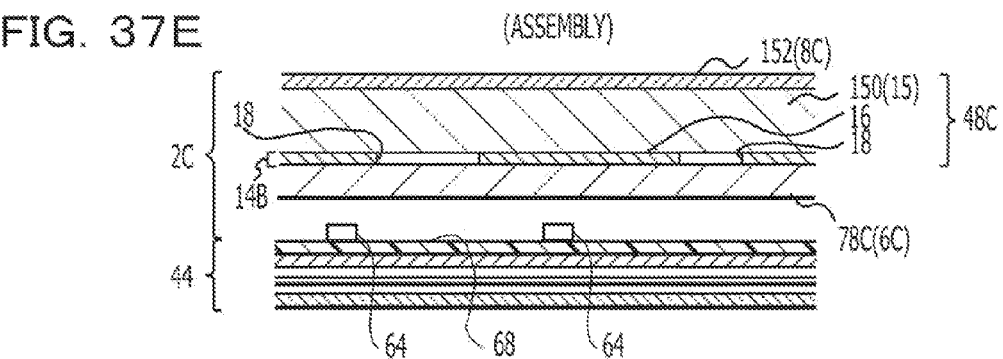

ILLUMINATION DEVICE INCLUDING LIGHT SOURCE, LIGHT DIFFUSER AND LIGHT SHIELD, AND MANUFACTURING METHOD THEREOF

CROSS-REFERENCE TO RELATED APPLICATIONS

This application is related to and claims the benefit of priority to Japanese Patent Application No. 2009-209328 filed on Sep. 10, 2009, the entire contents of which are incorporated herein by reference.

BACKGROUND

1. Field

The embodiments discussed herein are related to illuminating devices.

2. Description of Related Art

In mobile devices, such as mobile phone handsets, ornamental elements are provided on a face panel or similar outer material. Light sources are used as one such ornamental element. In some cases, the face panel may be replaced to change the ornamental design. Such ornamental elements contribute to improved flexibility in product design and value (i.e., product appeal).

Technology related to such ornamental elements has been proposed, wherein a face panel is removably attached to a housing of a device. Light from light-emitting mechanisms on the housing is then made to illuminate the face panel, and a translucent display pattern on the face panel is displayed. (See, for example, Japanese Unexamined Patent Application Publication No. 2002-125016.)

In addition, technology has been proposed wherein an illumination case is removably attached to a main body of a mobile device. The illumination case is then made to light up by light from a light source on the housing, or by light from a through-hole formed on the main body. (See, for example, U.S. Pat. No. 6,435,690.)

SUMMARY

It is an aspect of the embodiments discussed herein to provide an illumination unit including: a light source; a light guide-diffuser that guides and diffuses light from the light source; a selective translucent unit that reflects external light or reduces or suppresses the transmission of external light, while also transmitting light guided from the light guide-diffuser; and a presentation surface that presents light that has been guided from the light guide-diffuser and transmitted through the selective translucent unit.

The object and advantages of the invention will be realized and achieved by the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 22A to 22D illustrate examples of processes in respective manufacturing steps;
FIG. 27 is an exploded perspective view illustrating an exemplary mobile phone handset;
FIG. 28 is a cross-sectional view taken along the line XXVIII in FIG. 27;
FIGS. 37A to 37E illustrate examples of processes in respective manufacturing steps.

DESCRIPTION OF THE EMBODIMENTS

When using a light source to ornament a mobile device, uneven brightness may be produced and phenomena such as the unwanted appearance of light centered on the light source may lower the ornamental quality. In addition, the number of parts may increase, such as in implementations wherein an illumination function using a light guide device is added to the main body of the device, or in implementations wherein light is emitted through case holes. The number of parts increases in such cases because the above involve installing a light guide device separate from the device, as well as providing through-holes in the apparatus and positioning a light source.

The illumination unit, device, and manufacturing method hereinafter disclosed realize illumination by utilizing a light guide-diffuser that guides and diffuses light from a light source inside the device, and a selective translucent unit that transmits light guided by the light guide-diffuser.

First Embodiment

The first embodiment is provided with a selective translucent unit that reflects external light or reduces or suppresses the transmitting of external light, and a light guide-diffuser that guides and diffuses light. The first embodiment is configured such that light from a light source is guided and diffused by the light guide-diffuser, and then presented by the selective translucent unit. Light from the light source is received, guided, and diffused by the light guide-diffuser, and then evenly presented (i.e., emitted). This evenly-emitted light is then presented by the selective translucent unit.

Figure 1:
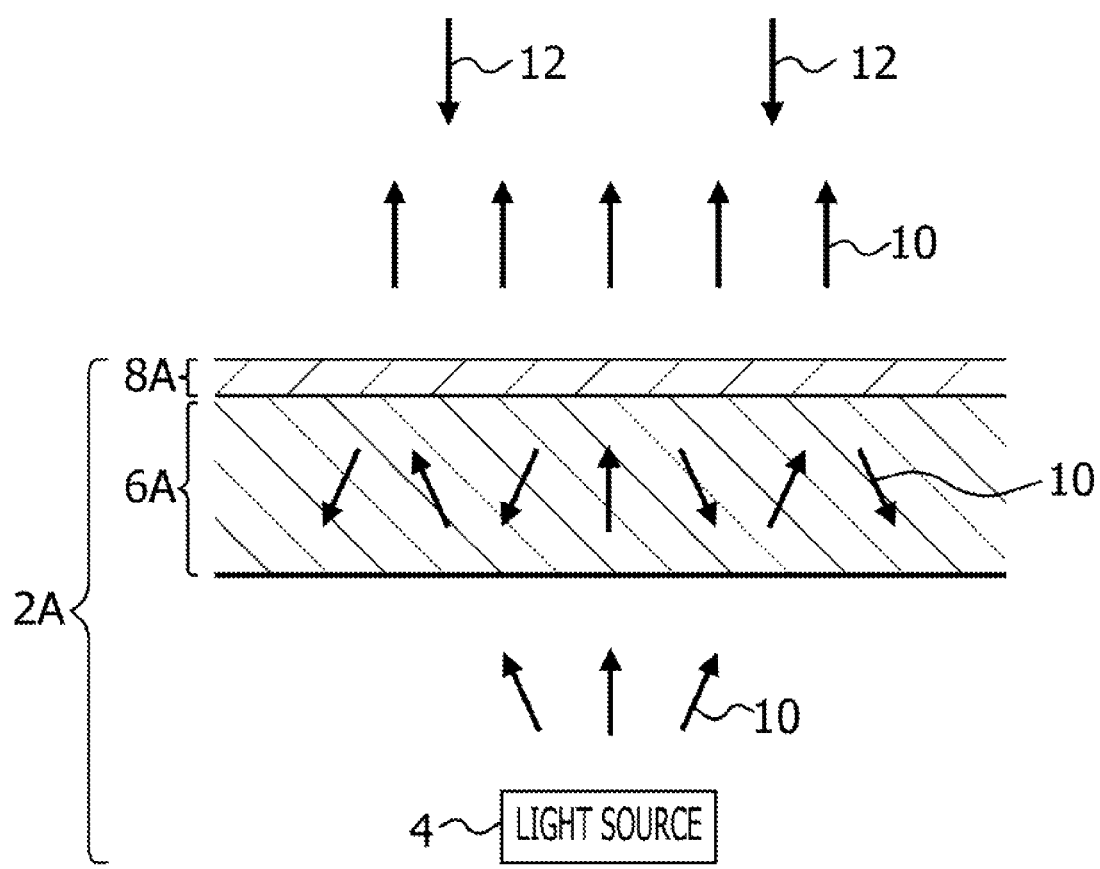
FIG. 1 illustrates an exemplary illumination unit.

The first embodiment will now be described with reference to FIG. 1. FIG. 1 illustrates one example of an illumination unit in accordance with the first embodiment. It should be appreciated that the configuration illustrated in FIG. 1 is merely one example, and that the present invention is not limited to such a configuration.

The illumination unit 2A is an element to present emitted illumination. As illustrated in FIG. 1, the illumination unit 2A has a light source 4, a light guide-diffuser 6A, and a selective translucent unit 8A.

The light source 4 is merely one example of a light-emitting mechanism. Although a single light source 4 is implemented in the present embodiment, a plurality of light sources may also be implemented. The light source 4 may be any light-emitting mechanism, and may be configured as a light-emitting diode (LED), for example. Once the light source 4 is activated, the light 10 emitted by the light source 4 irradiates the light guide-diffuser 6A, and enters the light guide-diffuser 6A.

Guiding the light 10, the light guide-diffuser 6A acts as light guiding mechanism and light diffusing mechanism by refracting and reflecting the light 10. In addition, the light guide-diffuser 6A is one example of a light-emitting mechanism that emits the light 10 by diffusion. The light guide-diffuser 6A may be configured as a planar material, for example. Acrylic, for example, may be used as the light guide material. Materials other than acrylic, such as plastics or glass, may also be used as the light guide material.

The selective translucent unit 8A is a selective translucent mechanism that reflects external light 12 or blocks the transmission of external light 12, while also transmitting the light 10 guided by the light guide-diffuser 6A. A half-mirror, for example, may be used in the selective translucent unit 8A. However, a mirror is not required, and the selective translucent unit 8A may also be configured with a colored coating able to transmit the light 10. In the case of reflecting the external light 12, the selective translucent unit 8A may be configured with, for example, a metal film or similar mirror.

Given such a configuration, illumination is realized as follows.

(1) Case where the light source 4 is activated. Light 10 emitted by the light source 4 enters the light guide-diffuser 6A. Having entered the light guide-diffuser 6A, the light 10 is diffused by being repeatedly refracted and reflected within the light guide-diffuser 6A, and is then emitted by the light guide-diffuser 6A by this diffusion. In this case, the light 10 is sufficiently diffused in the light guide-diffuser 6A, and light is evenly emitted. The light 10 being evenly emitted from the light guide-diffuser 6A is then received by the selective translucent unit 8A, which presents the even light 10. In so doing, illumination is generated. For example, if the selective translucent unit 8A is viewed from the outside, the viewer will perceive the light emitted by the light guide-diffuser 6A, and the selective translucent unit 8A will appear to shine.

In this case, components such as the light source 4 disposed behind the light guide-diffuser 6A become hidden as a result of the light guide-diffuser 6A, which presents the light 10 evenly diffused by refraction and reflection, and as a result of the selective translucency properties of the selective translucent unit 8A. Thus, the existence and position of the light source 4, for example, cannot be ascertained from the exterior of the selective translucent unit 8A (i.e., the top of the selective translucent unit 8A illustrated by way of example in FIG. 1). As a result, the emission origin of the light source 4 becomes hidden, and it becomes possible to prevent a "spotlight effect" caused by perceiving the emission origin.

Moreover, if a transparent resin mixed with a diffusing agent is used in the light guide-diffuser 6A, the diffusing agent inside the resin will facilitate the diffusion of the light 10, thereby enabling the light guide-diffuser 6A to emit light more evenly. By coloring the light guide-diffuser 6A, it also becomes possible to control the color and brightness of the light.

(2) Case where the light source 4 is deactivated. If the light source 4 is deactivated, then the light 10 is no longer incident on the light guide-diffuser 6A, and the presentation of the light 10 from the selective translucent unit 8A is stopped. In this case, the selective translucent unit 8A reflects the external light 12, or reduces or suppresses its transmission. In so doing, the selective translucent unit 8A becomes opaque, and the back of the selective translucent unit 8A cannot be perceived when viewed from the outside. For example, in the case where the light source 4 is deactivated, the inside of the light guide-diffuser 6A becomes dark, but the existence and position of the light guide-diffuser 6A and the light source 4 cannot be ascertained from the outside.

According to the first embodiment above, the light diffusing action of the light guide-diffuser 6A enables the light guide-diffuser 6A and the selective translucent unit 8A to evenly emit light. Furthermore, since diffuse light is obtained by the light guide-diffuser 6A, the production of uneven light and uneven color is reduced, while in addition, the light source 4 can be kept to a minimum number of components and light intensity.

Second Embodiment

The second embodiment is provided with a selective light shield between the light guide-diffuser and the selective translucent unit of the first embodiment. In so doing, light is guided and diffused by the light guide-diffuser, and then partially transmitted by the selective light shield. This causes the selective translucent unit to present a silhouette of the selective light shield.

Figure 2:
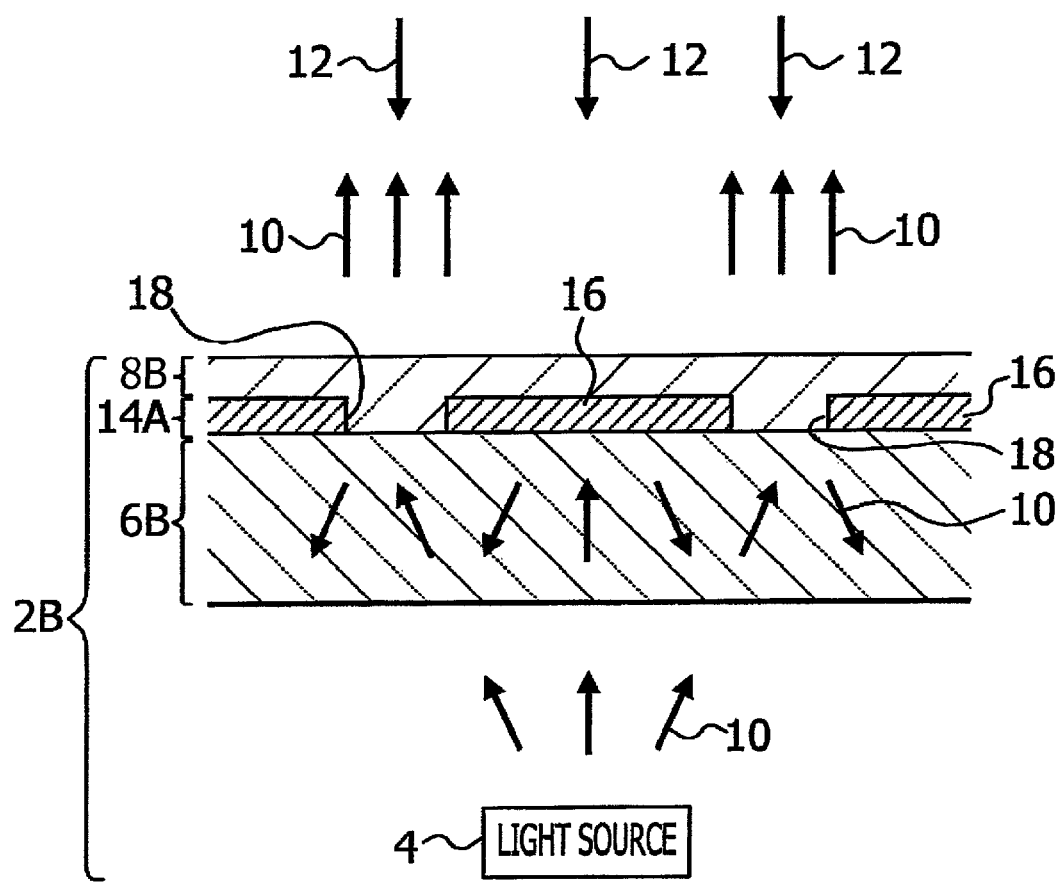
FIG. 2 illustrates an exemplary illumination unit.
Figure 3:
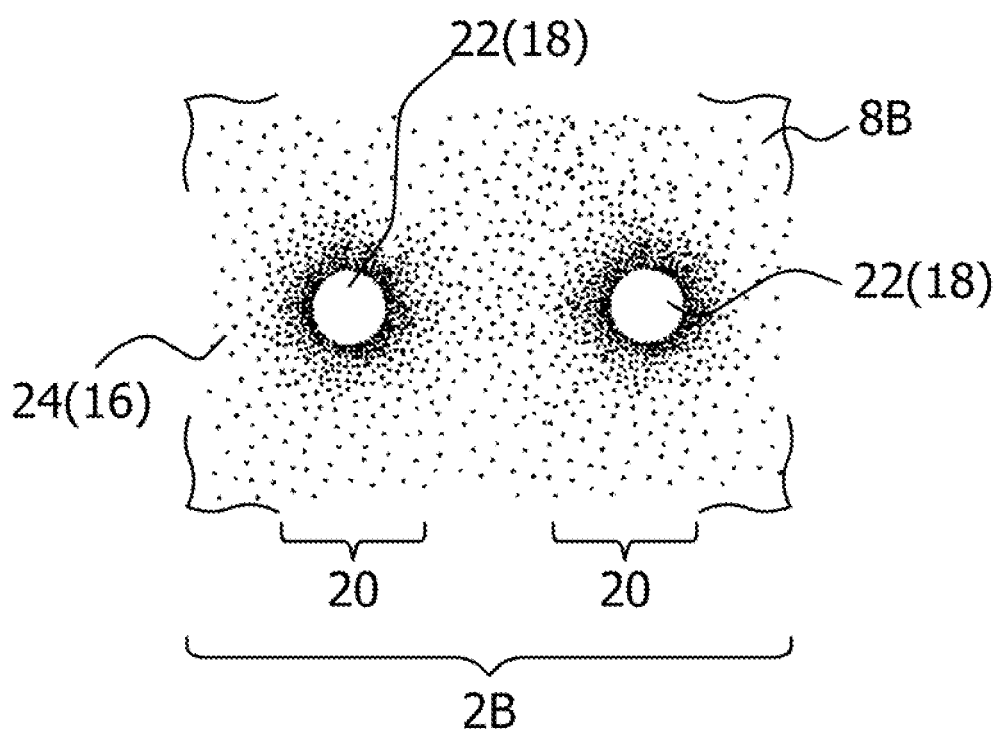
FIG. 3 illustrates an exemplary silhouette.

The second embodiment will now be described with reference to FIGS. 2 and 3. FIG. 2 illustrates one example of an illumination unit in accordance with the second embodiment. FIG. 3 illustrates a silhouette. It should be appreciated that the configuration illustrated in FIGS. 2 and 3 is merely one example, and that the present invention is not limited to such a configuration. In FIGS. 2 and 3, identical reference numbers are used for portions identical to that illustrated in FIG. 1.

The illumination unit 2B is constructed to present an illuminated silhouette on its outer surface. As illustrated in FIG. 2, the illumination unit 2B is provided with a light source 4, a light guide-diffuser 6B, a selective translucent unit 8B, and a selective light shield 14A. The light source 4 herein may be substantially identical to that of the first embodiment, and further description thereof is herein omitted.

The light guide-diffuser 6B corresponds to the light guide-diffuser 6A of the first embodiment, while the selective translucent unit 8B corresponds to the selective translucent unit 8A of the first embodiment. Both are provided with respectively similar functions.

The selective translucent unit 8B reflects external light 12 or blocks the transmission of external light 12, while also transmitting the light 10 guided by the light guide-diffuser 6B. The selective translucent unit 8B is similar to the selective translucent unit 8A in that a half-mirror, for example, may be used. However, a mirror is not required, and the selective translucent unit 8B may also be configured with a colored coating able to transmit light. In the case of reflecting the external light 12, the selective translucent unit 8B may be configured with a metal film or similar mirror.

The selective light shield 14A is a selective light-blocking mechanism (or in other words, a selective light-transmitting mechanism) that selectively transmits or blocks light. The selective light shield 14A is provided with light blockers 16 and light transmitters 18. The light blockers 16 are the portions that block light, while the light transmitters 18 are the portions that transmit light. By using light blockers 16 and light transmitters 18, a display pattern for presenting a specific silhouette is formed.

In the present embodiment, the light transmitters 18 (i.e., the spaces between one light blocker 16 and an adjacent light blocker 16) are provided by the selective translucent unit 8B. However, the light transmitters 18 may also simply be empty cavities in the illumination unit 2B.

Given such a configuration, illumination is realized as follows.

(1) Case where the light source 4 is activated. Light 10 emitted by the light source 4 enters the light guide-diffuser 6B. Having entered the light guide-diffuser 6B, the light 10 is diffused by being repeatedly refracted and reflected within the light guide-diffuser 6B, and is then emitted by the light guide-diffuser 6B by this diffusion. In this case, the light 10 is sufficiently diffused in the light guide-diffuser 6B, and light is evenly emitted, similarly to the first embodiment.

The light 10 being evenly emitted from the light guide-diffuser 6B then enters the selective translucent unit 8B from the light transmitters 18 of the selective light shield 14A. Meanwhile, transmission of the light 10 is prevented at the light blockers 16 of the selective light shield 14A. Illumination is thus generated. In this case, the light 10 from the light guide-diffuser 6B and the light transmitters 18 of the selective light shield 14A enters the selective translucent unit 8B, and as illustrated in FIG. 3, a silhouette 20 of the selective light shield 14A is presented. FIG. 3 illustrates one example of a silhouette presented on the upper surface of the illumination unit 2B (i.e., the top of the selective translucent unit 8B). In the silhouette 20 there are produced bright portions 22, which correspond to the light transmitters 18 of the selective light shield 14A, as well as dark portions 24, which correspond to the light blockers 16.

In this case, light is diffused in the light guide-diffuser 6B by refraction and reflection, and thus a person viewing the illumination unit 2B cannot see through the bright portions 22 of the silhouette 20 nor see the components behind the selective translucent unit 8B. In other words, when the light source 4 is activated, it becomes hidden, and the existence and position of the light source 4 cannot be ascertained from the exterior of the selective translucent unit 8B.

Like the first embodiment, if a transparent resin mixed with a diffusing agent is used in the light guide-diffuser 6B, the diffusing agent inside the resin will facilitate the diffusion of the light 10, thereby enabling the light guide-diffuser 6B to emit light more evenly. By coloring the light guide-diffuser 6B, it also becomes possible to control the color and brightness of the light.

(2) Case where the light source 4 is deactivated. If the light source 4 is deactivated, then the light 10 is no longer incident on the light guide-diffuser 6B, and the presentation of the light 10 from the selective translucent unit 8B is stopped. In this case, the selective translucent unit 8B reflects the external light 12, or reduces or suppresses its transmission. In so doing, the selective translucent unit 8B becomes opaque, and the back of the selective translucent unit 8B cannot be perceived when viewed from the outside. For example, in the case where the light source 4 is deactivated, there are sections inside the light guide-diffuser 6B that become dark, but the existence and position of the light guide-diffuser 6B and the light source 4 cannot be ascertained from the outside.

Third Embodiment

In the third embodiment, a light guide component that transmits light is installed behind the selective translucent unit of the first embodiment. Behind the light guide component, there is provided a selective light shield that transmits or blocks light. Behind the selective light shield, there is provided a light guide-diffuser. According to such a configuration, a silhouette of the selective light shield is presented as a result of light being blocked from or transmitted to the selective light shield.

Figure 4:
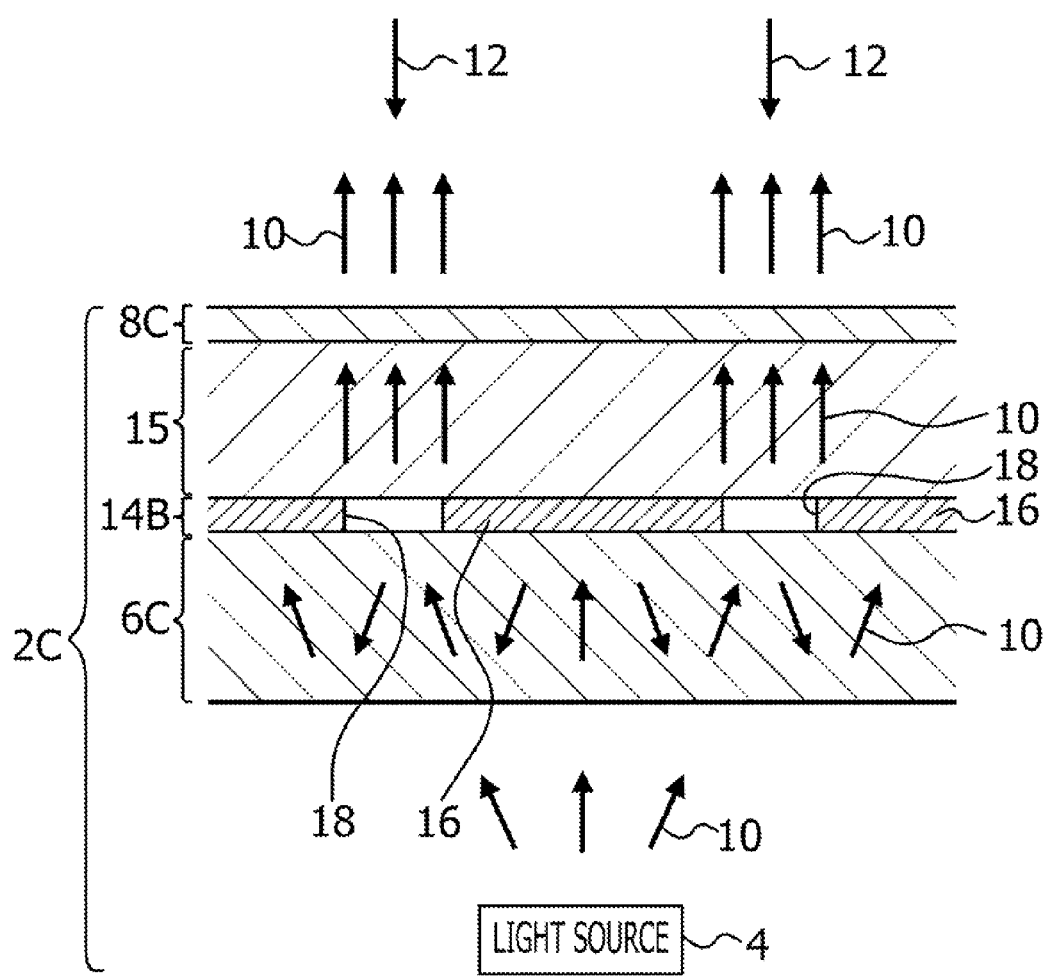
FIG. 4 illustrates an exemplary illumination unit.

The third embodiment will now be described with reference to FIG. 4. FIG. 4 illustrates one example of an illumination unit in accordance with the third embodiment. It should be appreciated that the configuration illustrated in FIG. 4 is merely one example, and that the present invention is not limited to such a configuration. In FIG. 4, identical reference numbers are used for portions identical to that illustrated in FIG. 1.

The illumination unit 2C is constructed to present an illuminated silhouette on its outer surface. As illustrated in FIG. 4, the illumination unit 2C is provided with a light source 4, a light guide-diffuser 6C, a selective translucent unit 8C, a selective light shield 14B, and a light guide component 15. The light source 4 herein may be substantially identical to that of the first embodiment, and further description thereof is herein omitted.

The light guide-diffuser 6C acts as light guiding mechanism and light diffusing mechanism by receiving light 10 from the light source 4, and then refracting and reflecting the light 10. In addition, the light guide-diffuser 6C is one example of a light-emitting mechanism that emits the light 10 by diffusion. The light guide-diffuser 6C may be configured as a planar material, for example. Acrylic, for example, may be used as the light guide material. Materials other than acrylic, such as plastics or glass, may also be used as the light guide material.

The selective translucent unit 8C is a selective translucent mechanism that reflects external light 12 or blocks the transmission of external light 12, while also transmitting the light 10 guided by the light guide-diffuser 6C. The selective translucent unit 8C herein is similar to the selective translucent unit 8A described earlier.

The selective light shield 14B is a mechanism for selectively blocking or transmitting light. The selective light shield 14B is provided with the light blockers 16 and light transmitters 18 as described earlier. The light blockers 16 are the portions that block light, while the light transmitters 18 are the portions that transmit light. By using light blockers 16 and light transmitters 18, a display pattern for presenting a specific silhouette is formed.

The light guide component 15 is one example of a light guiding mechanism. The light guide component 15 takes light 10 that has transmitted by the light transmitters 18 of the selective light shield 14B, and guides that light to the selective translucent unit 8C without diffusing the light. In this case, the light guide component 15 may also be a portion of the illumination unit 2C that functions as supporting mechanism for supporting the selective light shield 14B and the selective translucent unit 8C.

Given such a configuration, illumination is realized as follows.

(1) Case where the light source 4 is activated. Light 10 emitted by the light source 4 enters the light guide-diffuser 6C. Having entered the light guide-diffuser 6C, the light 10 is diffused by being repeatedly refracted and reflected within the light guide-diffuser 6C. In so doing, the light guide-diffuser 6C emits light. The even light 10 from the light guide-diffuser 6C then enters the light guide component 15 from the light transmitters 18 of the selective light shield 14B. Meanwhile, the light blockers 16 of the selective light shield 14B prevent transmission of some of the light.

The light guide component 15 guides the light 10 evenly emitted by the light guide-diffuser 6C and subsequently received from the light transmitters 18 of the selective light shield 14B. As a result, a silhouette 20 (see FIG. 3) of the selective light shield 14B is presented by the selective translucent unit 8C. As illustrated in FIG. 3, in the silhouette 20 there are produced bright portions 22, which correspond to the light transmitters 18 of the selective light shield 14B, as well as dark portions 24, which correspond to the light blockers 16.

Similarly to the previous embodiment, in this case, light is diffused in the light guide-diffuser 6C by refraction and reflection, and thus a person viewing the illumination unit 2C cannot see through the bright portions 22 of the silhouette 20 nor see the components behind the selective translucent unit 8C. In other words, when the light source 4 is activated, it becomes hidden, and the existence and position of the light source 4 cannot be ascertained from the exterior of the selective translucent unit 8C, just as in the previous embodiment.

Like the previous embodiments, if a transparent resin mixed with a diffusing agent is used in the light guide-diffuser 6C, the diffusing agent inside the resin will facilitate the diffusion of the light 10, thereby enabling the light guide-diffuser 6C to emit light more evenly. By coloring the light guide-diffuser 6C, it also becomes possible to control the color and brightness of the light.

(2) Case where the light source 4 is deactivated. If the light source 4 is deactivated, then the light 10 is no longer incident on the light guide-diffuser 6C, and the presentation of the light 10 from the selective translucent unit 8C is stopped. In this case, the light guide-diffuser 6C becomes dark, but the selective translucent unit 8C reflects the external light 12, or suppresses its transmission. In so doing, the selective translucent unit 8C becomes opaque, and the back of the selective translucent unit 8B cannot be perceived when viewed from the outside. Consequently, when the light source 4 is deactivated, the inside of the light guide-diffuser 6C becomes dark, but the existence and position of the light guide-diffuser 6C and the light source 4 cannot be ascertained from the exterior of the selective translucent unit 8C.

Illumination is thus obtained in the third embodiment, similarly to the second embodiment. In addition, by using the light diffusion of the light guide-diffuser 6C, it becomes possible for the light guide-diffuser 6C and the selective translucent unit 8C to evenly emit light. Moreover, since diffuse light is obtained by the light guide-diffuser 6C, light is evenly emitted, thereby making it possible to prevent the production of uneven light and uneven color in the bright portions 22 (see FIG. 3), while also reducing the number of components and light intensity in the light source 4.

Fourth Embodiment

In the fourth embodiment, the illumination unit 2B (i.e., the second embodiment) may be provided in a face component of a mobile phone handset.

Figure 5:
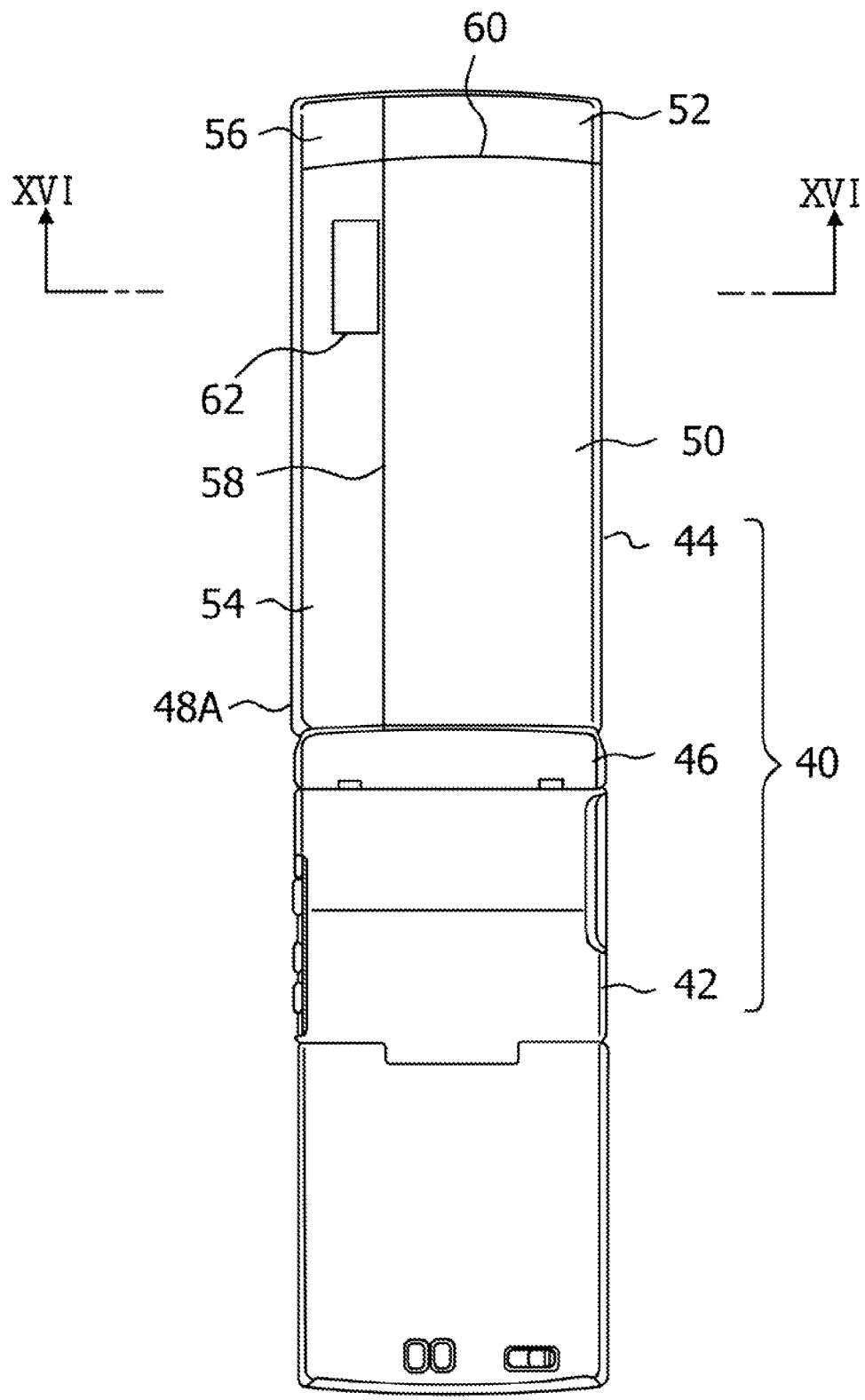
FIG. 5 illustrates an exemplary mobile phone handset.
Figure 6:
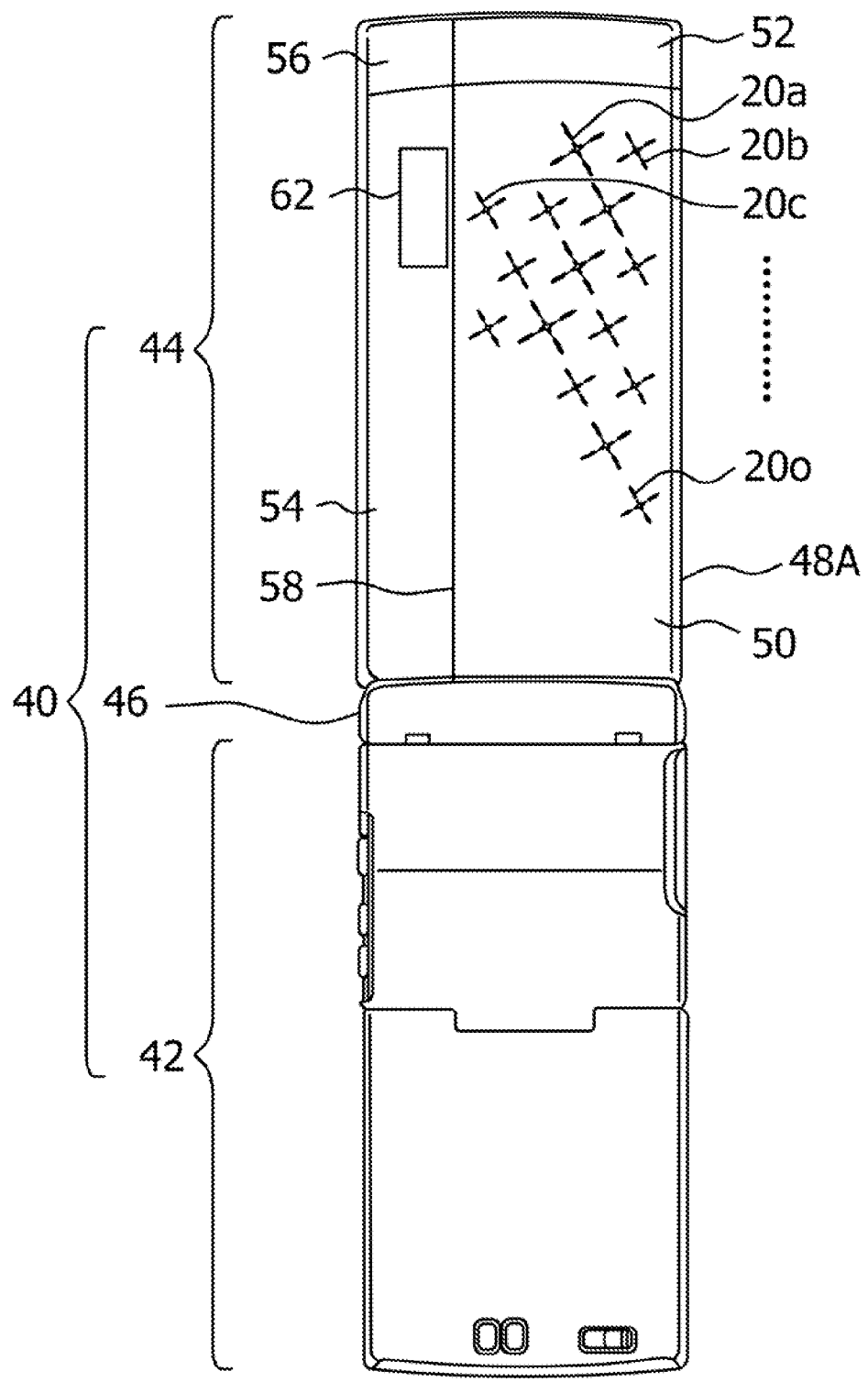
FIG. 6 illustrates an exemplary mobile phone handset presenting a silhouette.
Figure 7:
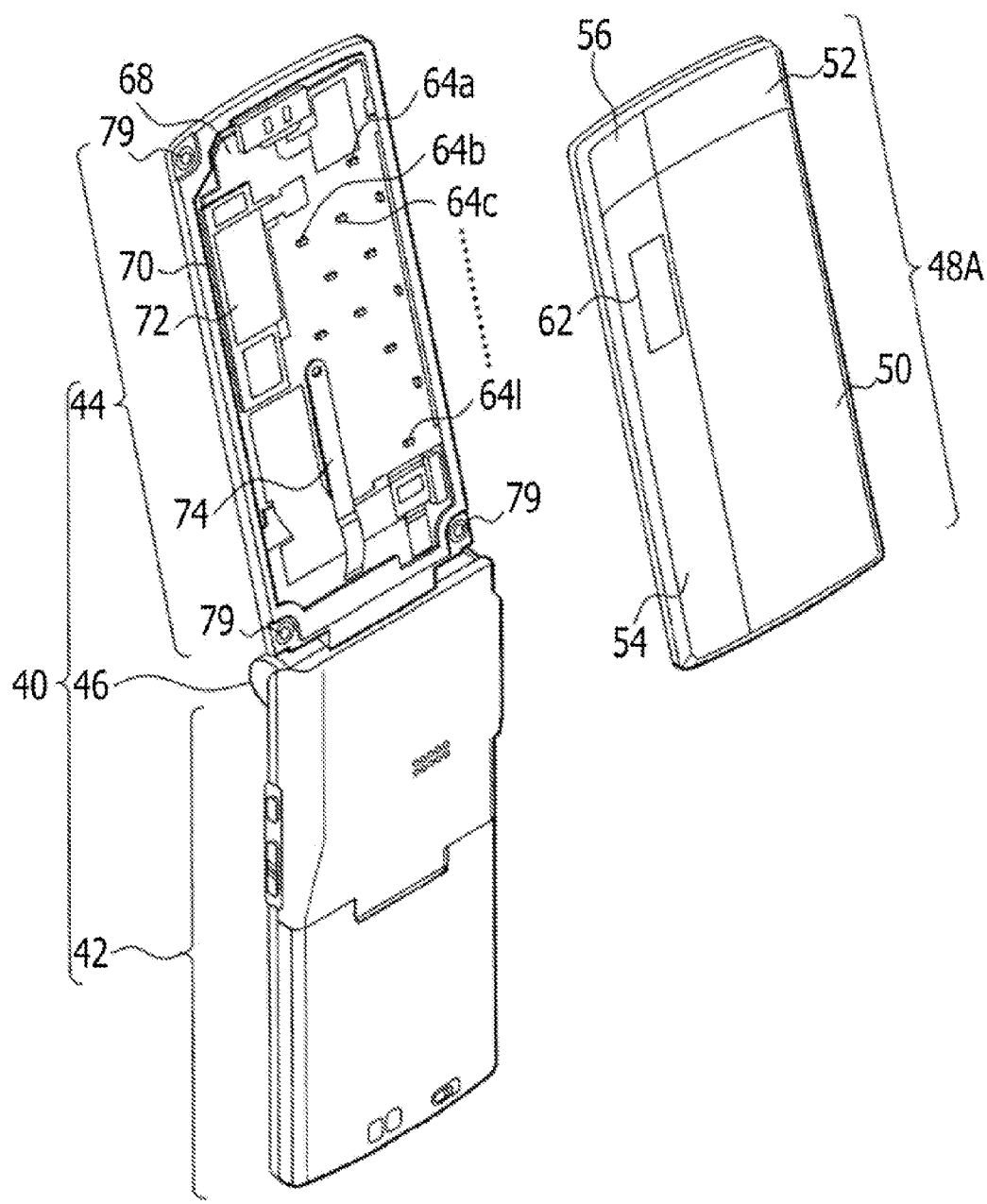
FIG. 7 is an exploded perspective view illustrating an exemplary display housing unit of a mobile phone handset.

The fourth embodiment will now be described with reference to FIGS. 5, 6, and 7. FIG. 5 illustrates one example of a mobile phone handset as seen from the back. FIG. 6 illustrates one example of a mobile phone handset made to present a silhouette. FIG. 7 is an exploded perspective view illustrating the display housing unit and case of a mobile phone handset. It should be appreciated that the configuration illustrated in FIGS. 5 to 7 is merely one example, and that the present invention is not limited to such a configuration.

The mobile phone handset 40 is one example of the illumination unit, device, and method disclosed herein. The mobile phone handset 40 generates illumination on its outer case. As illustrated in FIG. 5, the mobile phone handset 40 is provided with a keyboard housing unit 42 (a first housing unit) and a display housing unit 44 (a second housing unit), which can be opened and closed by a hinge 46. On the back of the display housing unit 44, there is provided a case unit 48A that acts as a back exterior member.

The case unit 48A is divided into a first area 50, a second area 52, a third area 54, and a fourth area 56, and boundaries 58 and 60 are formed indicating the boundaries between the respective areas 50, 52, 54, and 56. A display window in the form of a sub-display 62 is formed in the area 54. The sub-display 62 may be a transparent or semi-transparent window unit, for example.

On the back of the case unit 48A, there are disposed a plurality of LEDs 64a, 64b, 64c, . . . , 64l (see FIG. 7). Together, these LEDs 64a, 64b, 64c, . . . , 64l form the light source 4 described earlier. Consequently, when these LEDs 64a, 64b, 64c, . . . , 64l are activated, a plurality of silhouettes 20a, 20b, 20c, . . . , 20o can be presented in the area 50 of the case unit 48A, as illustrated in FIG. 6. In this case, the areas 52 and 54 also emit colored light, such as purple light. Consequently, illumination is generated as a result of the presentation of the silhouettes 20a, 20b, 20c, . . . , 20o and the emission of light.

As illustrated in FIG. 7, each of the LEDs 64a, 64b, 64c, . . . , 64l is disposed on a circuit board 68 installed in the display housing unit 44. Light-emitting elements having substantially identical intensities may be used for the respective LEDs 64*a*, 64*b*, 64*c*, . . . , 64*l*, for example, and such elements may be disposed on the planar part of the circuit board 68. In addition, the respective emission origins of the LEDs 64*a*, 64*b*, 64*c*, . . . , 64*l* may be spaced at equal or nearly equal distances from the case unit 48A. In so doing, the light intensities of the silhouettes 20*a*, 20*b*, 20*c*, . . . , 20*o* can be made uniform, and a desired light intensity can be set by a control.

In addition, a liquid crystal display (LCD) 70 is installed on the circuit board 68. The LCD 70 is one example of a display element, and the position of its display screen 72 corresponds to the position of the sub-display 62.

The driving of the LEDs 64*a*, 64*b*, 64*c*, . . . , 64*l* and the display control of the LCD 70 are conducted by a controller installed in the keyboard housing unit 42. Consequently, a flexible cable 74 extending from the circuit board 68 leads to the keyboard housing unit 42 via the hinge 46. A connector 76 at the end of the flexible cable 74 (see FIG. 8) is connected to the controller in the keyboard housing unit 42.

Figure 8:
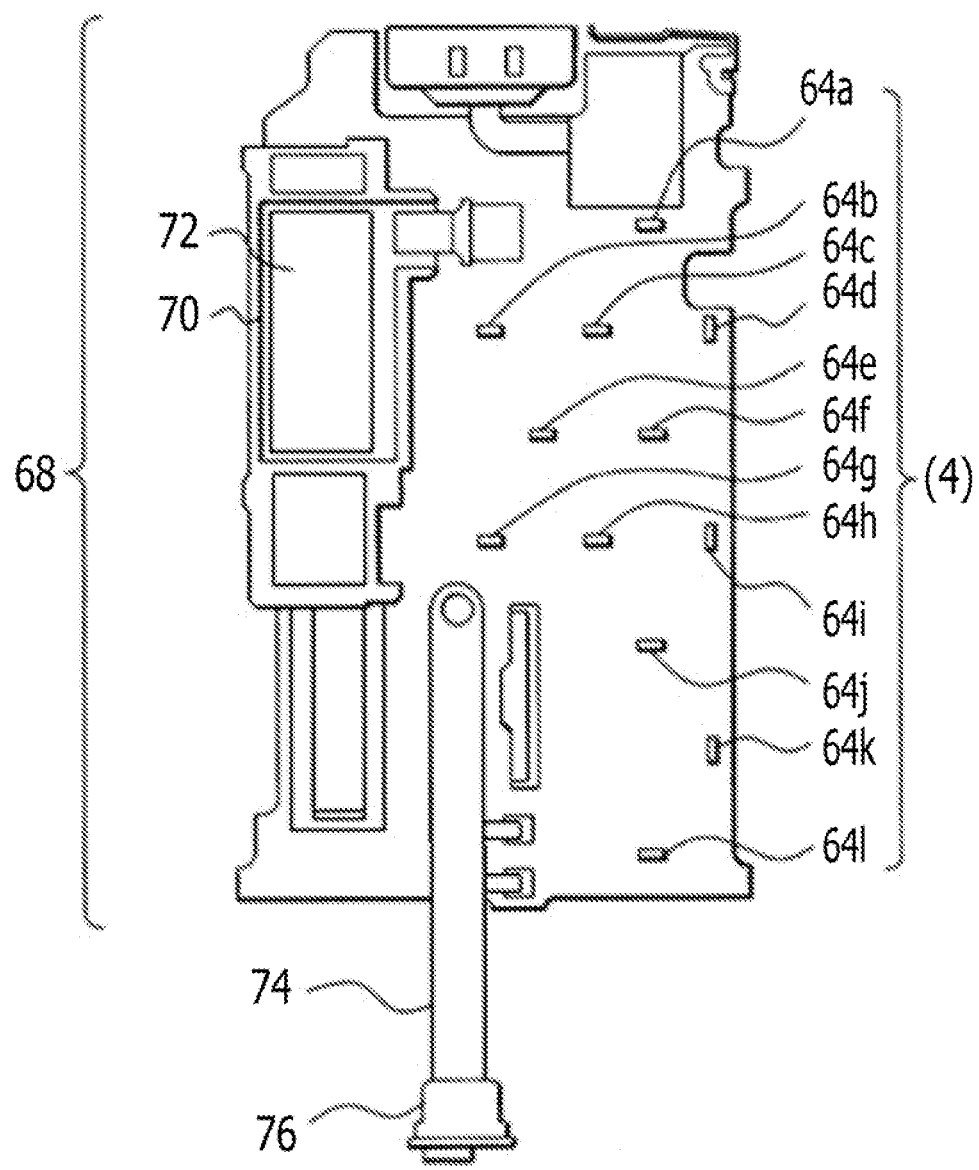
FIG. 8 illustrates an exemplary circuit board.
Figure 9:
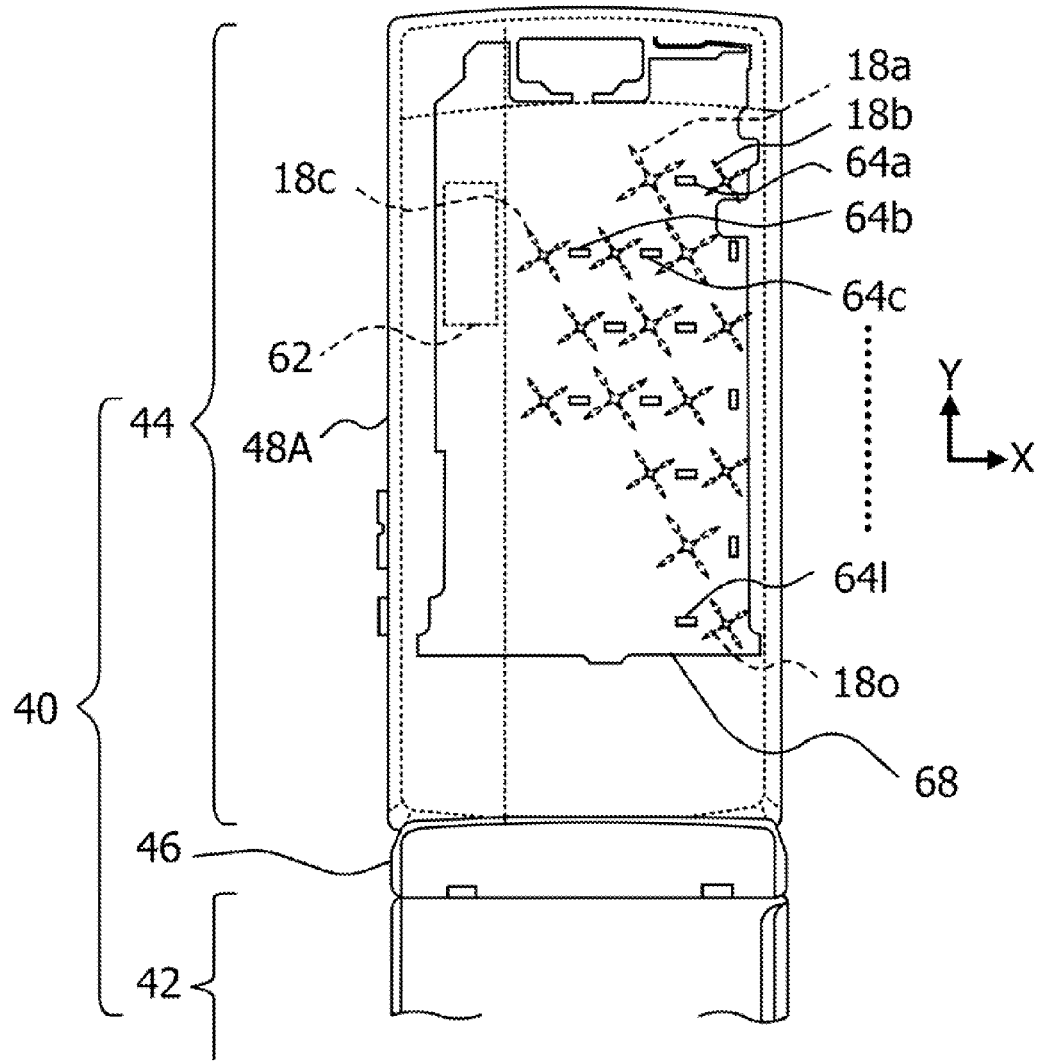
FIG. 9 is a transparent view illustrating an exemplary display housing unit.

(Arrangement of LEDs 64*a*, 64*b*, 64*c*, . . . , 64*l*) The arrangement of the LEDs 64*a*, 64*b*, 64*c*, . . . , 64*l*, and their relative positions with respect to the light transmitters 18*a*, 18*b*, 18*c*, . . . , 18*o* will now be described with reference to FIGS. 8 and 9. FIG. 8 illustrates one example of a circuit board. FIG. 9 is a transparent view illustrating a display housing unit.

As illustrated in FIG. 8, the LEDs 64*a*, 64*b*, 64*c*, . . . , 64*l* may be arranged such that the 12 elements form a 7-row by 5-column matrix. In this example, the LEDs 64*a*-64*l* are arranged such that the first row contains the LED 64*a*, the second row contains the LEDs 64*b*, 64*c*, and 64*d*, the third row contains the LEDs 64*e* and 64*f*, the fourth row contains the LEDs 64*g*, 64*h*, and 64*i*, the fifth row contains the LED 64*j*, the sixth row contains the LED 64*k*, and the final, seventh row contains the LED 64*l*. The LEDs on the respective rows are arranged to form a regular, staggered pattern. Furthermore, the LEDs 64*d*, 64*i*, and 64*k* disposed at the edge of the circuit board 68 are arranged orthogonally with respect to the other LEDs.

As illustrated in FIG. 9, being arranged in this way, the relative positions of the LEDs 64*a*, 64*b*, 64*c*, . . . , 64*l* differ from the positions of the light transmitters 18*a*, 18*b*, 18*c*, . . . , 18*o* that cause the silhouettes 20*a*, 20*b*, 20*c*, . . . , 20*o* to be presented by the emitted light from the LEDs 64*a*, 64*b*, 64*c*, . . . , 64*l*. In other words, the LEDs 64*a*, 64*b*, 64*c*, . . . , 64*l* are arranged in line with the light blockers 16. The spacing between adjacent LEDs 64*a*, 64*b*, 64*c*, . . . , 64*l* on the respective rows may be fixed or variable.

Consequently, the LEDs 64*a*, 64*b*, 64*c*, . . . , 64*l*, the silhouettes 20*a*, 20*b*, 20*c*, . . . , 20*o* are presented with evenly emitted light. In other words, the number of installed LEDs 64*a*, 64*b*, 64*c*, . . . , 64*l* is less than the number of light transmitters 18*a*, 18*b*, 18*c*, . . . , 18*o* (15, in this case) that cause the silhouettes 20*a*, 20*b*, 20*c*, . . . , 20*o* to be presented.

Figure 10:
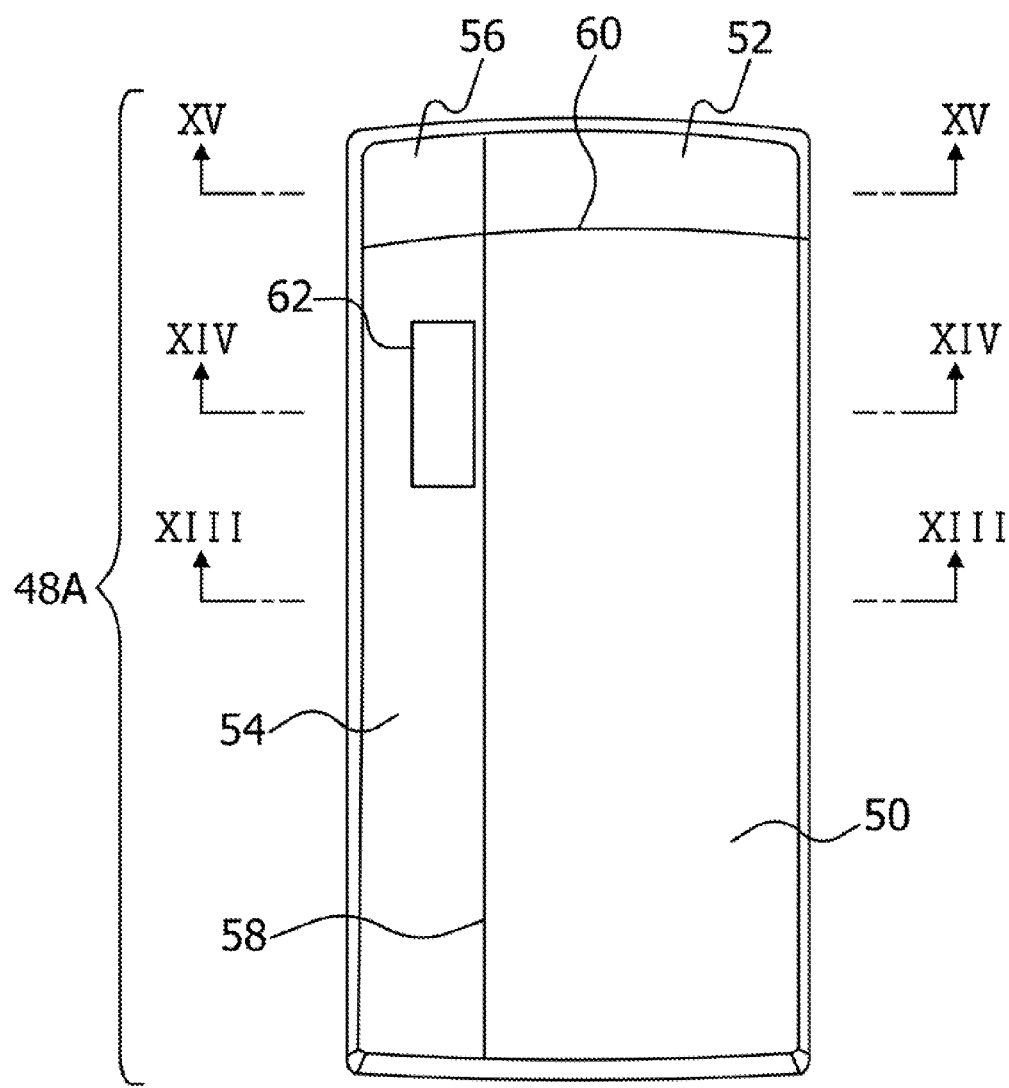
FIG. 10 illustrates an exemplary case.

(Case unit 48A) The case unit 48A will now be described with reference to FIGS. 10-15. As illustrated in FIG. 10, the case unit 48A is substantially rectangular and divided into the areas 50, 52, 54, and 56. In order to divide the case unit 48A into the respective areas 50, 52, 54, and 56, boundaries 58 and 60 are formed indicating the boundaries between areas. Although the areas 50 to 56 are made to respectively differ in surface area and shape herein, substantially identical shapes may be used, and substantially identical surface areas may be set. Furthermore, the number of divisions and the setting of surface areas is arbitrary. Meanwhile, the boundaries 58 and 60 may be, for example, rectilinear, curved, or belt-shaped. The boundaries 58 and 60 may be grooves, projections, or some other kind of step dividing the areas 50, 52, 54, and 56.

The area 50 corresponds to the selective translucent unit 8B and the light transmitters 18 of the selective light shield 14A described earlier (see FIG. 2). The area 50 may have a half-mirror construction, and its surface color may be black, for example. The areas 52 and 54 correspond to the light blockers 16 of the selective light shield 14A described earlier (see FIG. 2). The areas 52 and 54 may be semi-transparent, colored units. The specific color of the areas 52 and 54 may be purple, for example. Meanwhile, the area 56 is a light blocking unit that does not transmit light. The specific color of the area 56 may be gold, for example. A metallic foil that does not transmit light may be applied to the area 56.

Figure 11:
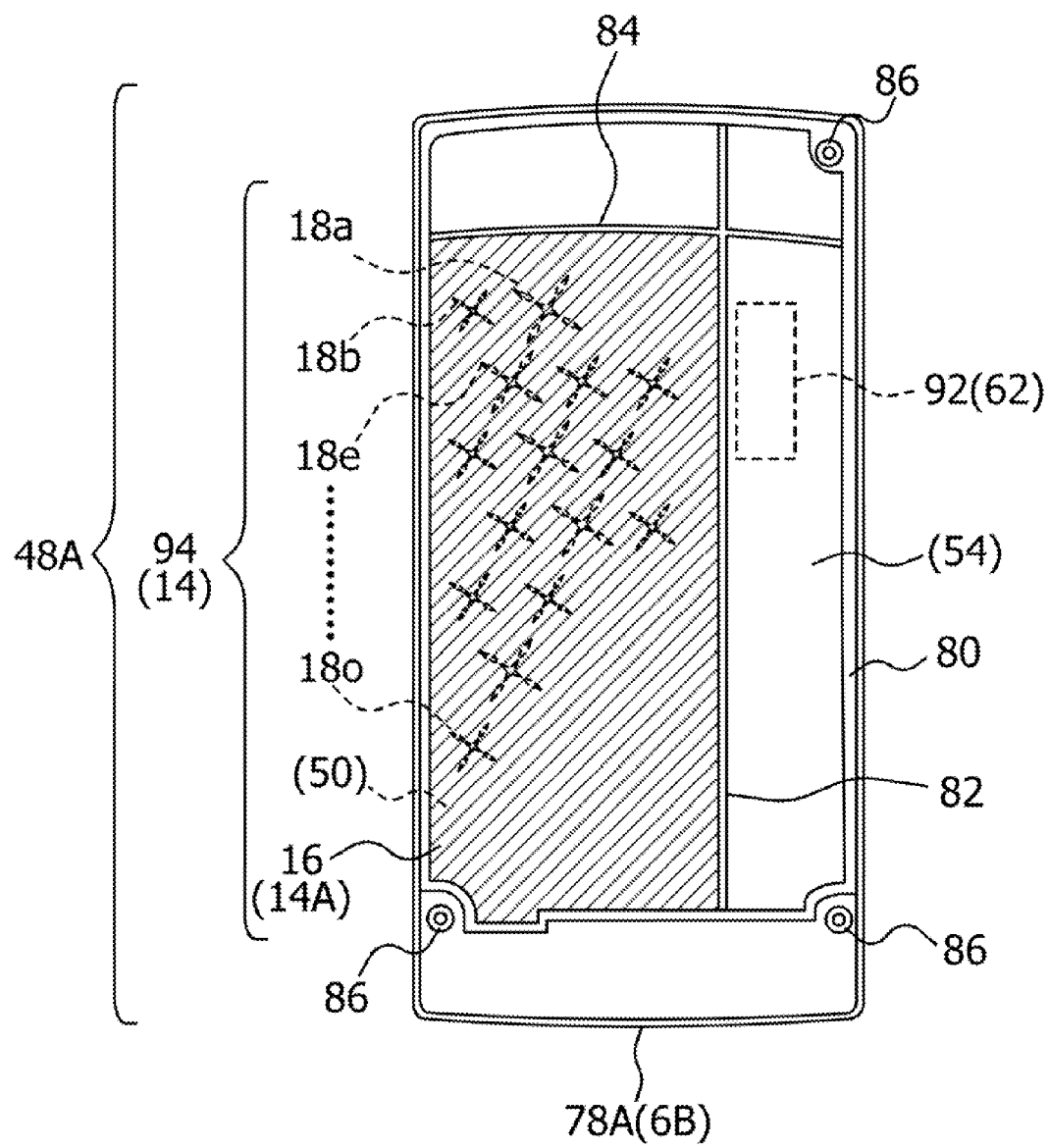
FIG. 11 illustrates a rear view of an exemplary case.

As illustrated in FIG. 11, the case unit 48A is provided with a case body unit 78A. The case body unit 78A may constitute the light guide-diffuser 6B described earlier (see FIG. 2), and may be molded from transparent plastic, for example. A step 80 is formed around the outer edge of the case body unit 78A. On the inner side of the step 80, there are formed the vertical walls 82 and 84, which correspond to the boundaries 58 and 60 (see FIG. 10). The step 80 and the vertical walls 82 and 84 are formed integrally with the case body unit 78A. The display housing unit 44 is joined to the step 80 via an adhesive mechanism. By providing the case body unit 78A with the step 80 and the vertical walls 82 and 84, the strength of the case body unit 78A is increased, which helps strengthen the case unit 48A. In addition, fixtures 86 for affixing the case body unit 78A to the display housing unit 44 are formed at the corners of the case body unit 78A. The fixtures 86 on the case body unit 78A are affixed to fixtures 79 on the display housing unit 44 (see FIG. 7) using screws or similar mechanism.

Figure 12:
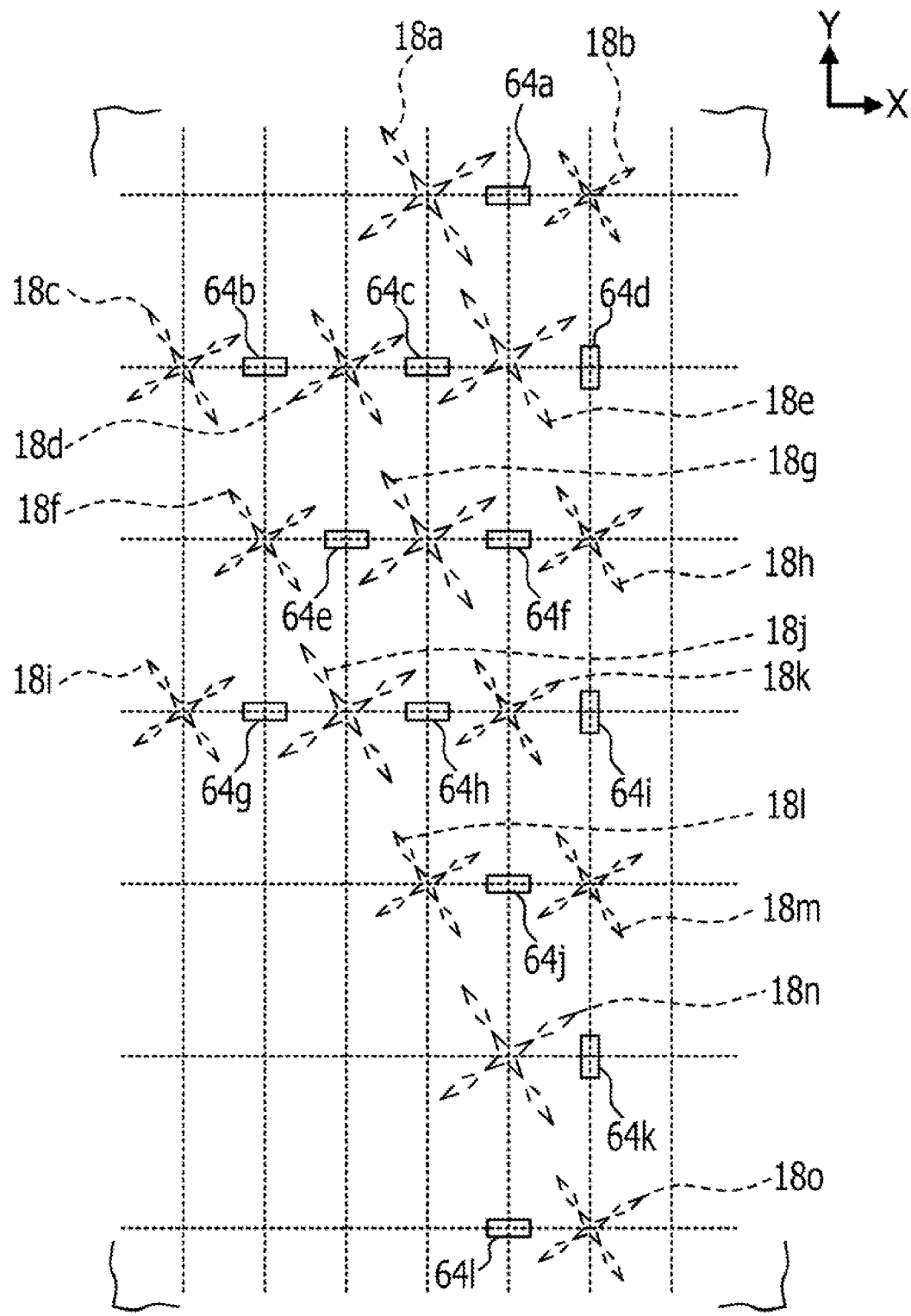
FIG. 12 illustrates LEDs and light transmitters superimposed over each other.

In the area 50, there are formed the plurality of light transmitters 18*a*, 18*b*, 18*c*, . . . , 18*o* as well as the light blockers 16 for generating the silhouettes 20*a*, 20*b*, 20*c*, . . . , 20*o* described earlier. As illustrated in FIG. 12, the LEDs 64*a*, 64*b*, 64*c*, . . . , 64*l* are arranged at different positions with respect to the light transmitters 18*a*, 18*b*, 18*c*, . . . , 18*o*. In addition, a translucent window 92 corresponding to the sub-display 62 is formed in the area 54.

Figure 13:
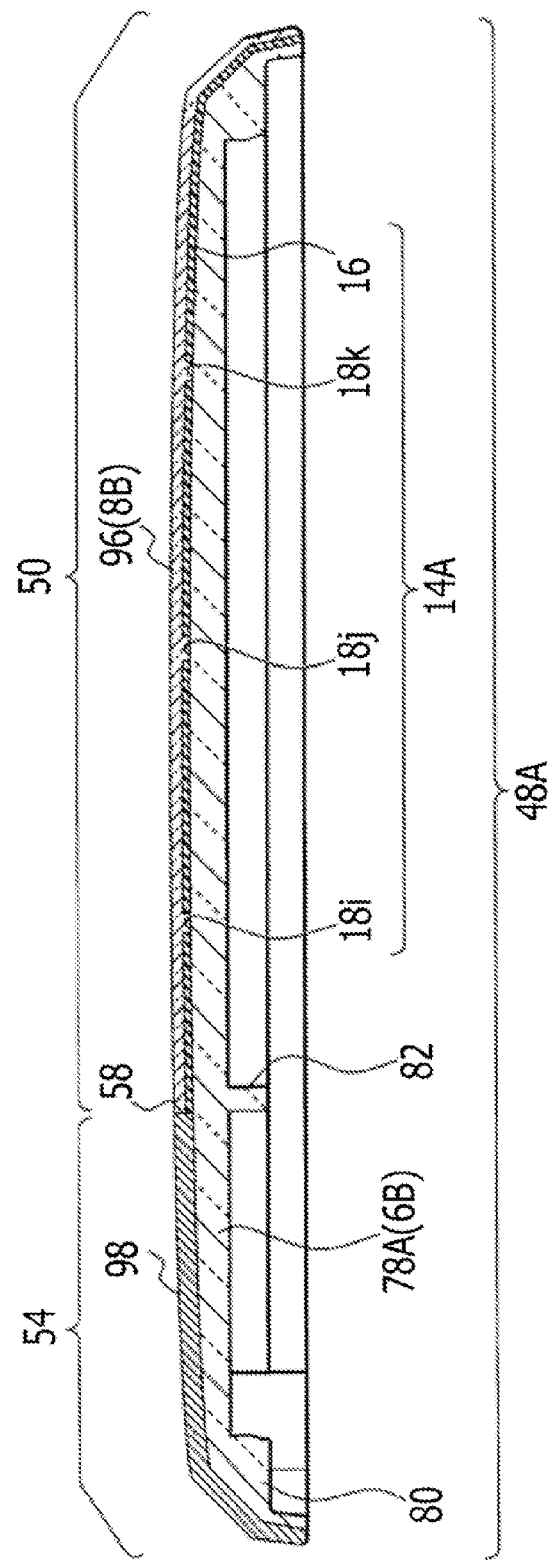
FIG. 13 is a cross-sectional view taken along the line XIII in FIG. 10.
Figure 14:
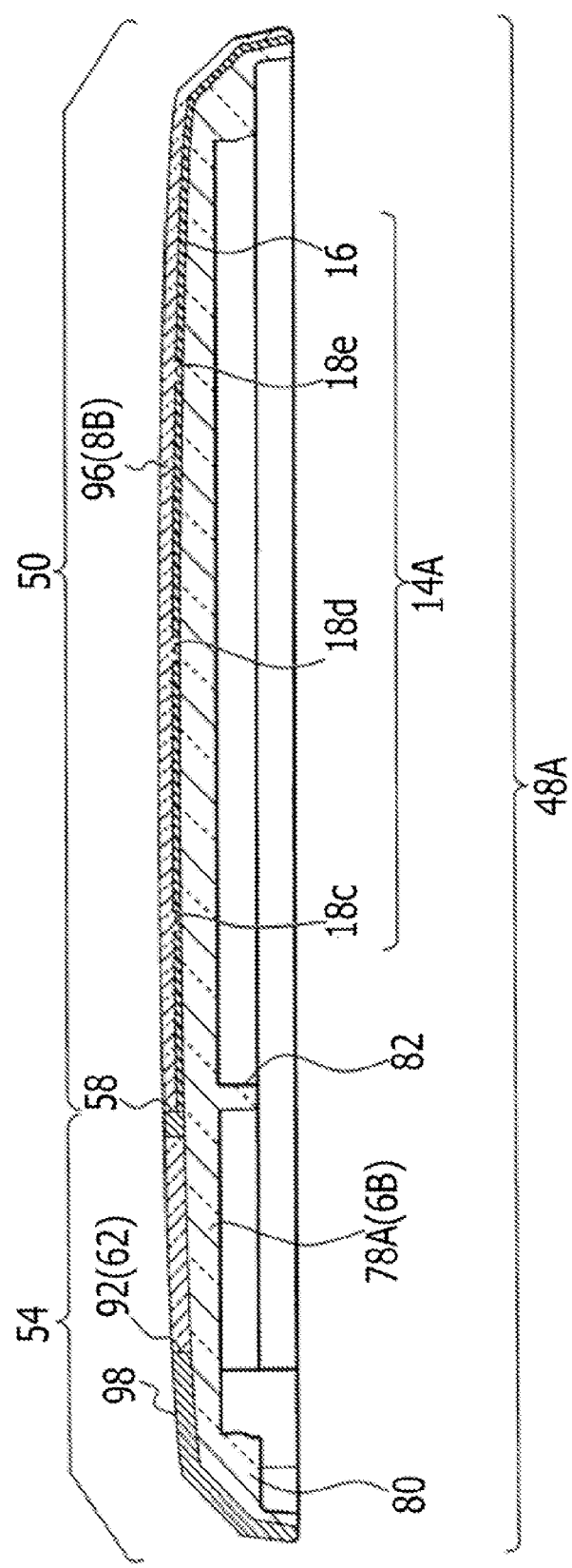
FIG. 14 is a cross-sectional view taken along the line XIV in FIG. 10.

The areas 50 and 54 will now be described with reference to FIGS. 13 and 14. In the area 50, the selective light shield 14A is formed on the surface of the case body unit 78A. In the selective light shield 14A, there are formed the light transmitters 18*a*, 18*b*, 18*c*, . . . , 18*o* and the light blockers 16 that were described earlier. The light transmitters 18*a*, 18*b*, 18*c*, . . . , 18*o* and the light blockers 16 may be formed by, for example, die-cut printing, coating, or vapor deposition. A half-mirror 96 is formed on the exterior of the selective light shield 14A. The half-mirror 96 corresponds to the selective translucent unit 8B described earlier. The half-mirror 96 blocks external light 12 (see FIG. 2). In addition, the half-mirror 96 is one example of a mechanism for presenting the evenly emitted light of the case body unit 78A. The half-mirror 96 may be formed by half-mirror vapor deposition with a black finish, for example.

In the area 54, a semi-transparent unit 98 is formed on top of the case body unit 78A. The semi-transparent unit 98 may be a colored layer formed by vapor deposition or printing, for example. In addition, in the area 54, the translucent window 92 is formed on top of the case body unit 78A, as illustrated in FIG. 14. The translucent window 92 may be formed with a transparent resin layer by coating or printing, for example.

Figure 15:
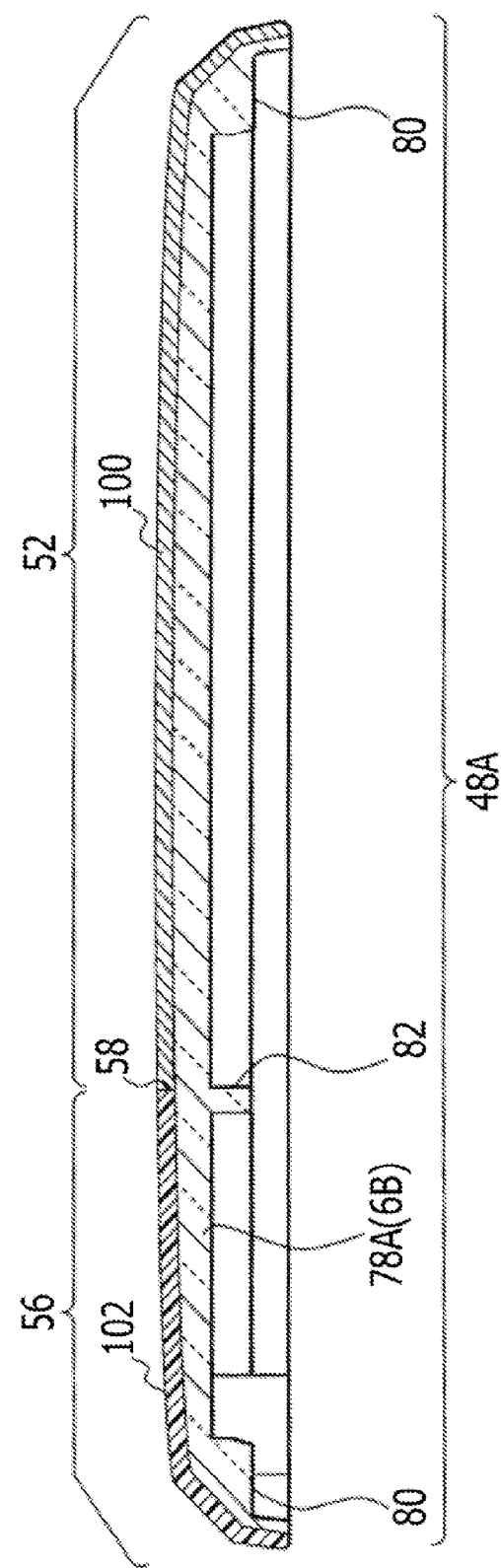
FIG. 15 is a cross-sectional view taken along the line XV in FIG. 10.
Figure 16:
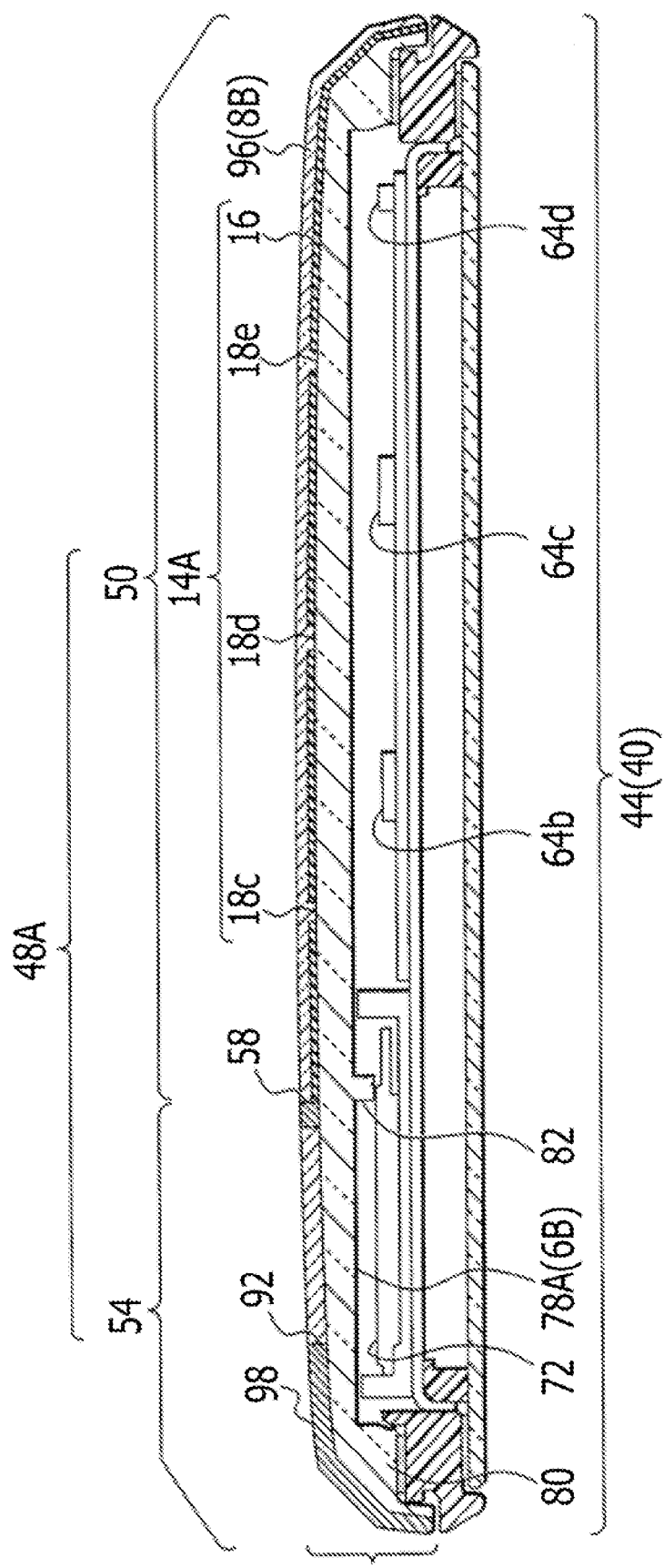
FIG. 16 is a cross-sectional view taken along the line XVI in FIG. 5.

The areas 52 and 56 will now be described with reference to FIG. 15. In the area 52, a semi-transparent unit 100 is formed on top of the case body unit 78A, while in the area 56, a light-blocking unit 102 is formed. The semi-transparent unit 100 is a colored layer formed by, for example, vapor deposition or printing, similarly to the semi-transparent unit 98.

(Illumination unit 2B and illumination generation) Next, the illumination unit and illumination generation in the mobile phone handset 40 will be described with reference to FIGS. 16-19.

Figure 17:
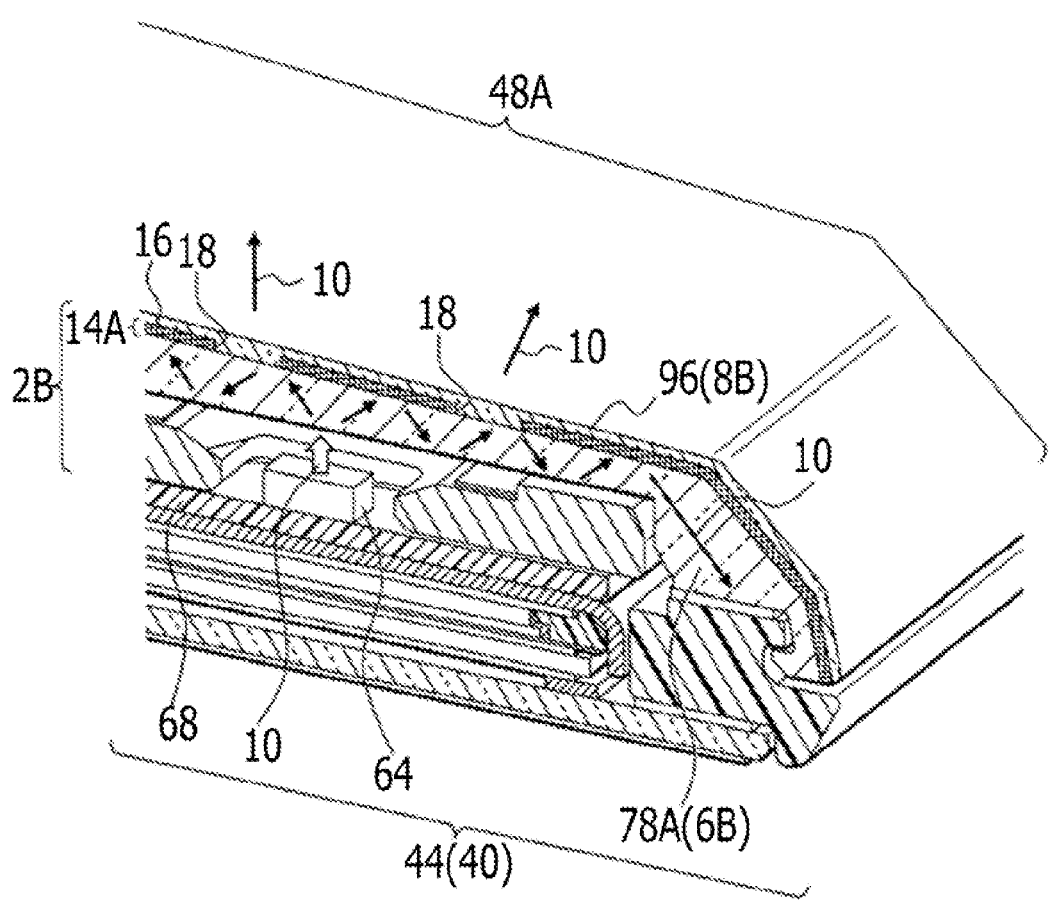
FIG. 17 is a perspective view illustrating how light is emitted.

The mobile phone handset 40 is provided with the case unit 48A described earlier, and as illustrated in FIG. 16, the illumination unit 2B described earlier is realized. In the mobile phone handset 40 provided with such an illumination unit 2B, when the LEDs 64 emit light, the light 10 enters the case body unit 78A, as illustrated in FIG. 17. The LEDs 64 correspond to the LEDs 64a, 64b, 64c, . . . , 64l described earlier.

Figure 18:
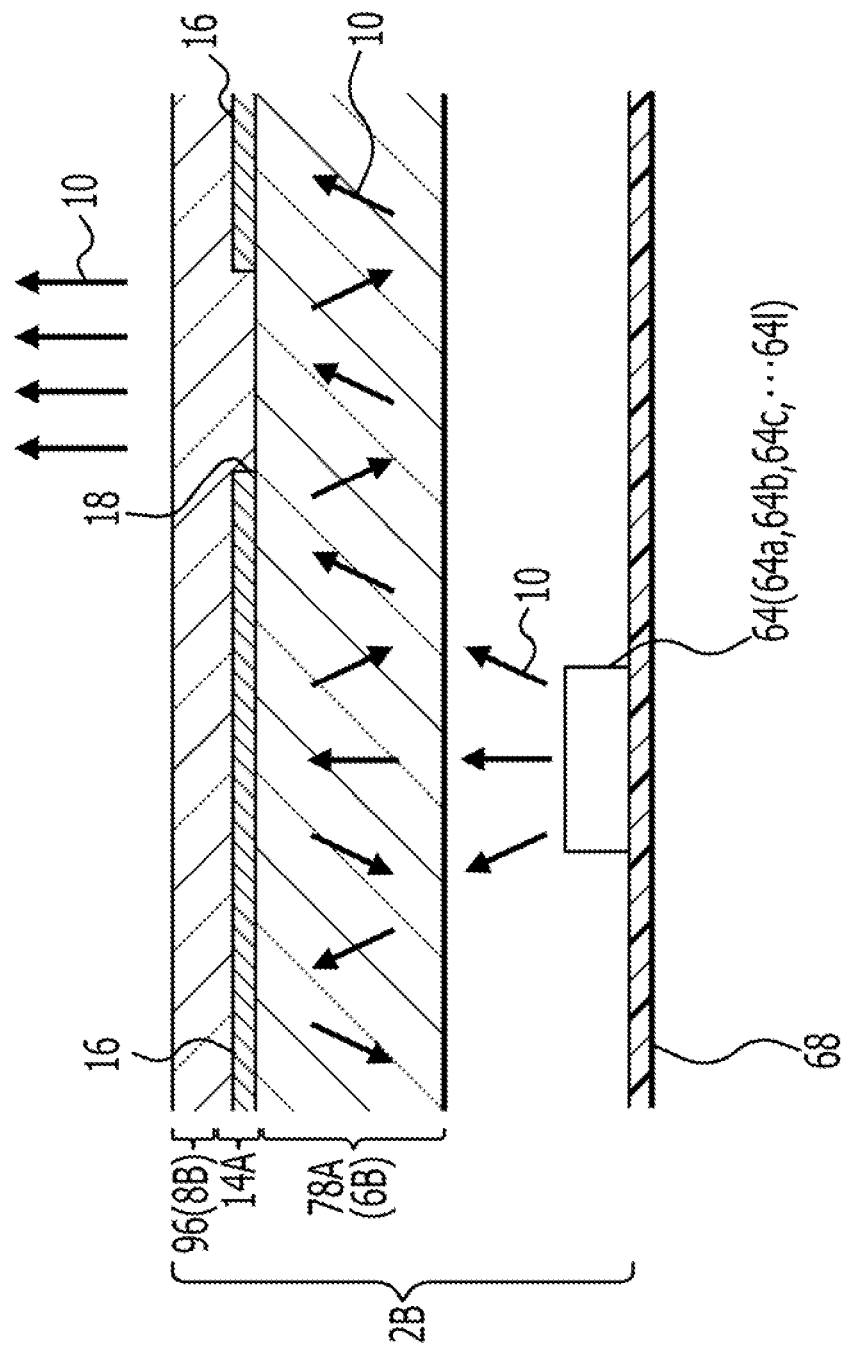
FIG. 18 illustrates an exemplary illumination.

As described earlier, the case body unit 78A may constitute the light guide-diffuser 6B (see FIG. 2). Thus, as illustrated in FIG. 18, the light 10 is guided and diffused while being repeatedly refracted and reflected, thereby causing the case body unit 78A to emit light. By using this light emission, the light 10 is transmitted by the light transmitters 18 of the selective light shield 14A, and blocked by the light blockers 16. The light 10 that is transmitted by the light transmitters 18 radiates outside the mobile phone handset 40 from the half-mirror 96. The light transmitters 18 correspond to the light transmitters 18a, 18b, 18c, . . . , 18o described earlier.

Figure 19:
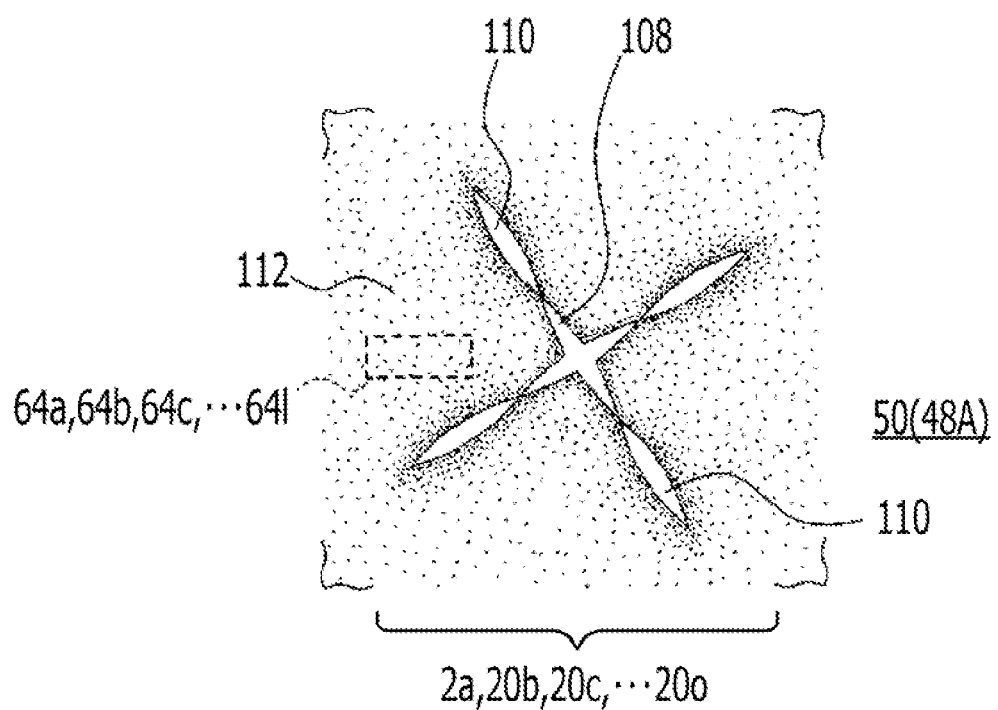
FIG. 19 illustrates an exemplary silhouette.

As a result, the silhouettes 20a, 20b, 20c, . . . , 20o are presented in the area 50 by the light transmitters 18 and light blockers 16 of the selective light shield 14A, and illumination is generated, as illustrated in FIG. 19. In this case, the silhouettes 20a, 20b, 20c, . . . , 20o are formed having a bright portion 108 in their centers, with bright portions 110 radiating outward, as well as a dark portion 112.

The bright portions 108 and 110 are at different positions from the emission centers of the LEDs 64a, 64b, 64c, . . . , 64l. Given such relative positions, the light 10 is guided and diffused while being repeatedly refracted and reflected, thereby causing the case body unit 78A to emit even light. For this reason, illumination is generated wherein the bright portion 108 and the bright portions 110 emit light of uniform brightness, and the silhouettes 20a, 20b, 20c, . . . , 20o are presented at uniform brightness.

(Hardware of Mobile Phone Handset 40)

Figure 20:
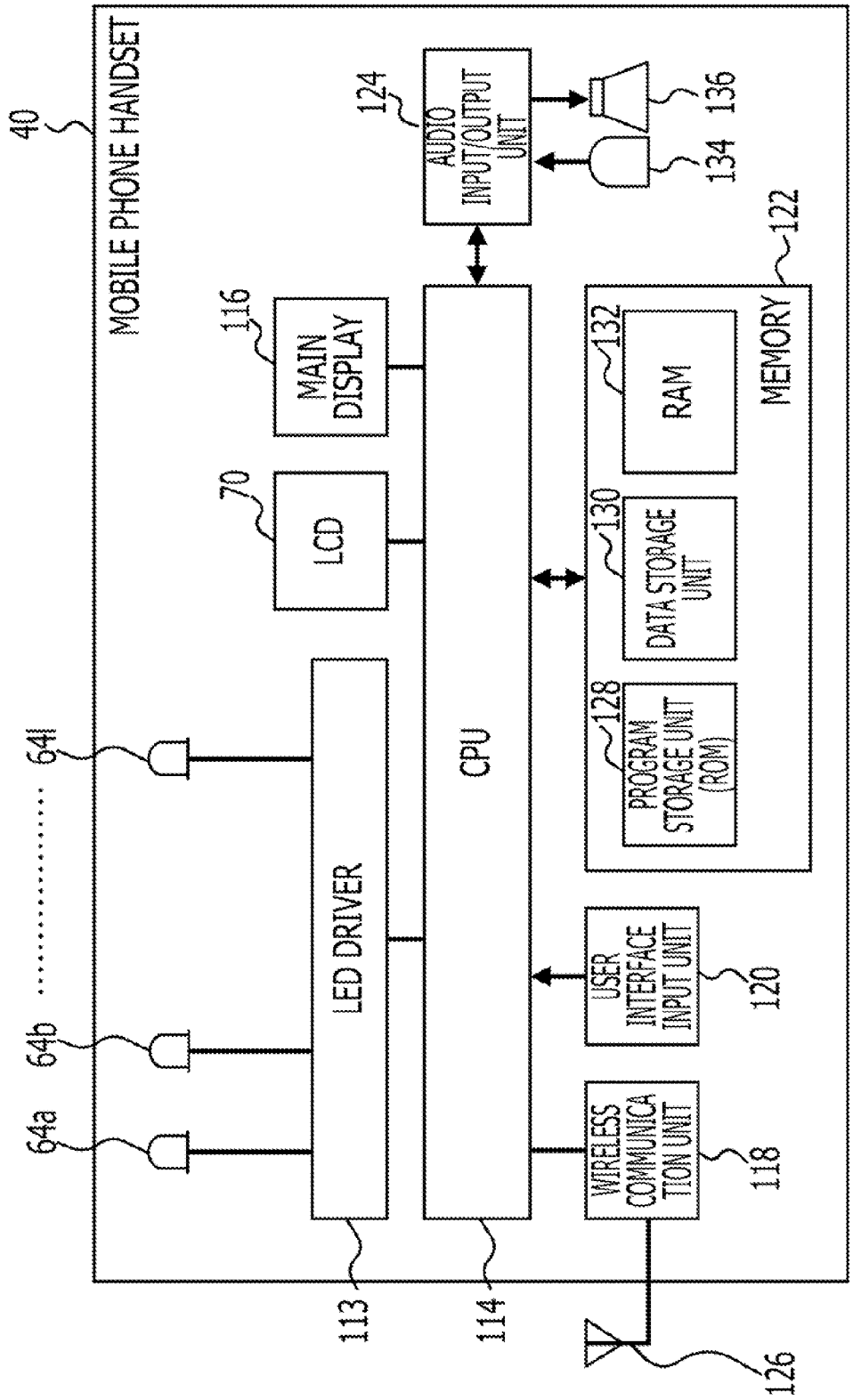
FIG. 20 illustrates exemplary hardware of a mobile phone handset.

The hardware of the mobile phone handset 40 will now be described with reference to FIG. 20. FIG. 20 illustrates the hardware of a mobile phone handset. It should be appreciated that the configuration illustrated in FIG. 20 is merely one example, and that the present invention is not limited to such a configuration. In FIG. 20, identical reference numbers are used for portions identical to that illustrated in FIG. 8.

In the mobile phone handset 40, the LEDs 64a, 64b, 64c, . . . , 64l described earlier are connected to and driven by an LED driver 113. The LED driver 113 is connected to a central processing unit (CPU) 114. Driving control is conducted by the CPU 114. The CPU 114 executes software such as an operating system (OS) and application programs. In addition, the CPU 114 is one example of a control mechanism for controlling various function units, and may perform light emission control for the LEDs 64a, 64b, 64c, . . . , 64l as well as communication control, for example.

The mobile phone handset 40 is provided with the LCD 70 described earlier, a main display 116, a wireless communication unit 118, a user interface input unit 120, memory 122, and an audio input/output unit 124. The main display 116 is one example of a display mechanism installed on the front side of the display housing unit 44. The main display 116 is controlled by the CPU 114 to display content such as images and text. The wireless communication unit 118 is controlled by the CPU 114, and is a wireless communication mechanism used for functions such as wirelessly communicating with a base station. The wireless communication unit 118 is provided with an antenna 126, and conducts actions such as telephony and data transfer on the basis of sent and received wireless signals and call controls. The user interface input unit 120 is used for user-supplied text input and various control inputs. The user interface input unit 120 is provided with elements such as text keys, cursor keys, and an OK or Enter key, for example.

The memory 122 is one example of a mechanism for storing programs and data, and is provided with a program storage unit (read-only memory, or ROM) 128, a data storage unit 130, and random access memory (RAM) 132. The memory 122 is realized by one or more recording media. The program storage unit 128 is a mechanism for storing the OS and various programs. The data storage unit 130 stores data, while the RAM 132 is used as a work area.

The audio input/output unit 124 is a mechanism for inputting and outputting audio signals, and is provided with a microphone 134 and a receiver 136. Audio signals are input from the microphone 134, while audio is played back from the receiver 136.

Thus, a call or email arriving at the mobile phone handset 40 triggers an LED control output issued from the CPU 114. Having received the LED control output, the LED driver 113 applies a driving output to the respective LEDs 64a, 64b, 64c, . . . , 64l, and each of the LEDs 64a, 64b, 64c, . . . , 64l emits light. As a result of this light emission, the silhouettes 20a, 20b, 20c, . . . , 20o are presented by the illumination unit 2B, and illumination is generated.

The features, advantages, and exemplary modifications of the above fourth embodiment are listed below.

(1) Illumination is generated by light 10 in the outer material of a mobile device such as the mobile phone handset 40. Such illumination increases the visibility of incoming communication as well as the ornamental design of the mobile phone handset 40, thereby making it possible to improve product appeal. Acting as a light source, the LEDs 64a, 64b, 64c, . . . , 64l produce light 10, which is guided and diffused to generate illumination by presenting the light 10 or silhouettes of the light 10. In so doing, the efficiency and quality of the illumination is increased.

(2) By using a transparent resin (an existing case material) for the illumination unit, a half-mirror (or light-blocking) configuration can be realized on the front or back surface of the illumination unit by coating or printing. Internally emitted light from LEDs or similar elements can be used as a light source. By guiding and causing such light from inside the case itself to enter the transparent resin portion on the outer surface of the case, part or all of the case can be made to emit light.

(3) The functions of the light guide-diffuser 6B (i.e., its functions as a light guiding mechanism and light diffusing mechanism) may simply be added to the case unit 48A. In so doing, the case material can be made to emit uniform light, and illumination can be generated without introducing a separate device for the purpose of illumination. Since the light 10 is guided and diffused by installing the light guide-diffuser 6B, the emitted light intensity from the LEDs or other light-emitting module can be efficiently utilized. Consequently, it is not necessary to dispose a separate LED for each light emission point in the silhouettes.

(4) A case resin or other transparent resin can be used for the light guide-diffuser 6B, and uniform light emission can be obtained if a diffusing agent is mixed with the resin. Furthermore, by coloring the resin, it also becomes possible to control the color and brightness of the light.

(5) A silhouette of evenly emitted light can be presented on the case unit 48A, thereby making it possible to provide a mobile phone handset 40 or similar mobile device with excellent visual design.

(6) In the present embodiment, the light guiding and diffusing functions of the case body unit 78A enable the case body unit 78A to evenly emit light. In so doing, the number of installed LEDs that constitute the light-emitting module can be kept low with respect to the number of light transmitters 18a, 18b, 18c, . . . , 18o that cause the silhouettes to be presented. As a result, the number of LEDs and other parts can be kept low. By thus simplifying the configuration, it becomes possible to increase freedom of design in incorporating various component devices into the mobile phone handset or other mobile device.

(7) The light guiding and diffusing functions of the case body unit 78A enable the case body unit 78A to emit light, with light being evenly emitted from the outer surface of the device. As a result, it becomes possible to prevent uneven brightness, particularly the phenomenon whereby the light becomes highly localized around the center of the light source. In so doing, the quality of illumination can be increased.

(8) In the present embodiment, the case unit 48A is configured as a single unit, and does not make use of a separate panel. For this reason, the number of parts can be kept low. Moreover, it becomes easier to realize waterproof and detachable constructions, and since gaps are reduced, the intrusion of static electricity can be reduced or prevented.

(9) Using a transparent resin for the case unit 48A, the half-mirror 96 can be formed on its front or back surface by coating or another method. With such a configuration, the LEDs 64a, 64b, 64c, . . . , 64l that act as the light source can be internally housed in the display housing unit 44. The light 10 from LEDs 64a, 64b, 64c, . . . , 64l can thus be made to enter the case unit 48A and be completely guided and diffused, and be emitted by the case unit 48A.

Fifth Embodiment

The fifth embodiment is a method for manufacturing the mobile phone handset 40 (see FIGS. 5 to 20). The fifth embodiment will be described with reference to FIGS. 21 and 22A to 22D.

Figure 21:
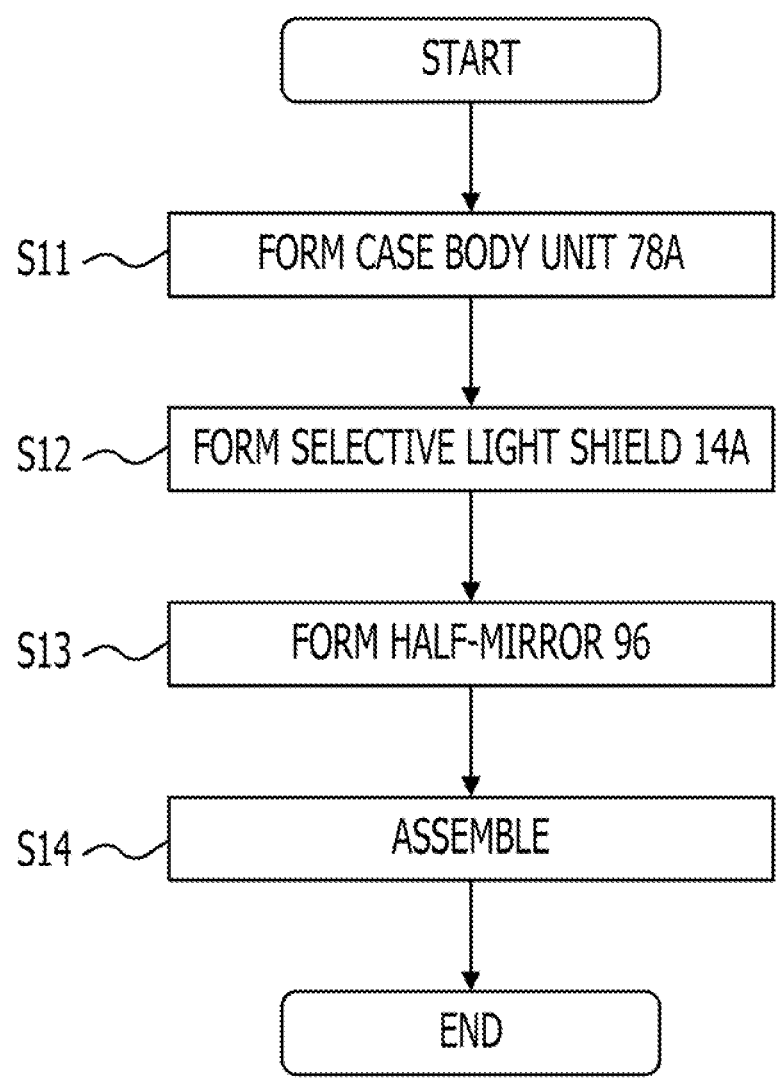
FIG. 21 is a flowchart illustrating an exemplary method for manufacturing a mobile phone handset.

As illustrated in FIG. 21, the manufacturing process includes the following steps: forming the case body unit 78A (S11); forming the selective light shield 14A (S12); forming the half-mirror 96 (S13); and assembly (S14).

FIG. 22A illustrates one example of forming the case body unit 78A (S11). In this step (S11), the case body unit 78A may be formed by molding a light guiding material. The light guiding material may be a transparent plastic, such as acrylic. The case body unit 78A is formed by, for example, a single-piece molding process. Its shape may be the same as that illustrated in FIG. 11. If a diffusing agent that diffuses light is mixed into the resin used as the light guiding material, then the light diffusing properties can be increased, and light can evenly emitted. In addition, a coloring agent can be mixed into the resin. By thus coloring the case body unit 78A, the color and intensity of the emitted light can be adjusted.

FIG. 22B illustrates one example of forming the selective light shield 14A (S12). In this step (S12), the selective light shield 14A is formed on the outer surface of the case body unit 78A by using a light-blocking material. The light-blocking material may be any material having light-blocking properties, such as an opaque ink, an opaque paint, or a metal. For example, the selective light shield 14A can be formed on the outer surface of the case body unit 78A by printing in the case of an opaque ink, by coating in the case of an opaque paint, or by vapor deposition or a similar process in the case of a metal.

By forming the selective light shield 14A in this way, a plurality of light transmitters 18 and light blockers 16 are formed on the surface of the case body unit 78A. The light transmitters 18 correspond to the light transmitters 18a, 18b, 18c, . . . , 18o. In other words, light is transmitted by the light transmitters 18, and blocked by the light blockers 16. The formation of the selective light shield 14A is the process whereby the case body unit 78A is granted light-selecting properties.

FIG. 22C illustrates one example of forming the half-mirror 96 (S13). In this step (S13), the half-mirror 96 (8B) is formed on the front layer of the selective light shield 14A, which itself resides on the outer surface of the case body unit 78A. The half-mirror 96 is formed using a transparent material. The half-mirror 96 reflects external light or suppresses the transmitting of external light. The half-mirror 96 is a layer that functions to transmit light guided by the case body unit 78A, and may also constitute a surface protecting layer. In the case where the half-mirror 96 is made to reflect external light while transmitting the light from the case body unit 78A, the half-mirror 96 may be formed by coating or printing a half-mirror material. In this case, since the surface layer corresponding to the half-mirror 96 functions sufficiently to suppress light, there may also be a colored layer formed by printing or coating a colored paint. Using the steps described above, the case unit 48A is formed.

FIG. 22D illustrates one example of assembly (S14). In the assembly step, the case unit 48A is attached to the back of the display housing unit 44, and the mobile phone handset 40 is assembled. The circuit board 68 is installed in the display housing unit 44 in advance, with the LEDs 64 described earlier being installed onto the circuit board 68. Each of the LEDs 64 is disposed in line with one of the light blockers 16, in a position that does not correspond to the light transmitters 18. Herein, the LEDs 64 correspond to the LEDs 64a, 64b, 64c, . . . , 64l.

Via such assembly, the mobile phone handset 40 is manufactured. In the mobile phone handset 40, the silhouettes 20a, 20b, 20c, . . . , 20o described earlier can be presented to generate illumination by the emission of light from the LEDs 64, as well as the light-selecting properties of the light transmitters 18 and the light blockers 16 in the selective light shield 14A of the case unit 48A. In addition, according to this manufacturing method, the number and configuration of parts that constitute the illumination can be simplified, and manufacturing costs can be reduced.

Sixth Embodiment

Figure 23:
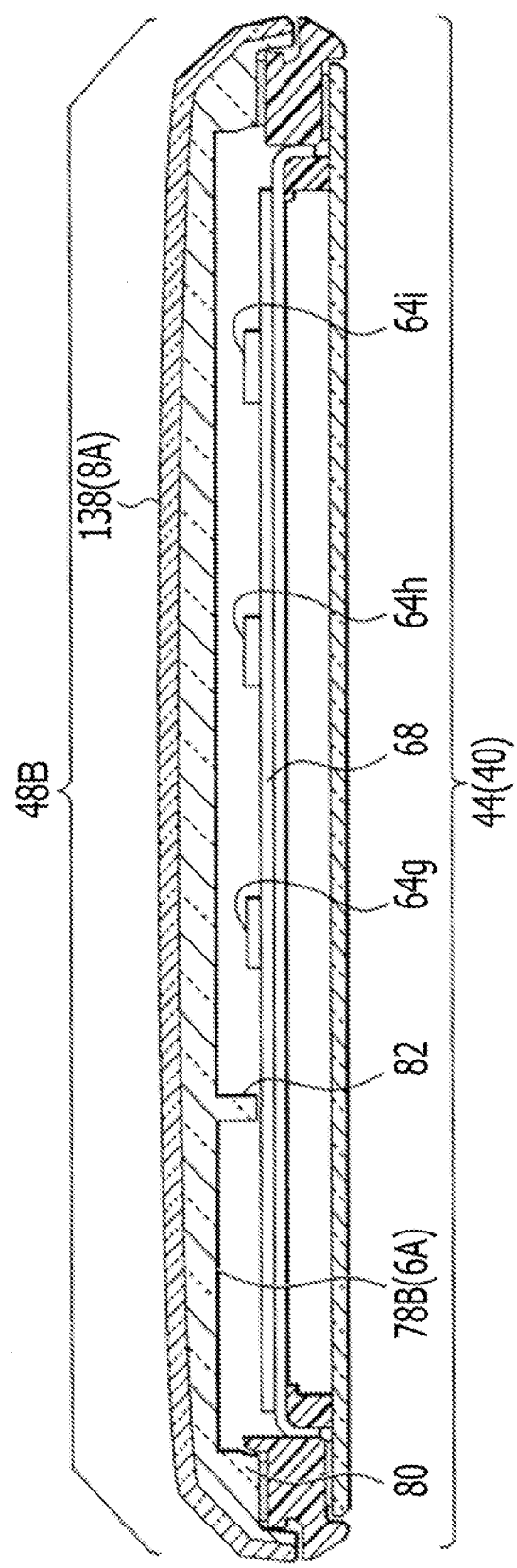
FIG. 23 is a cross-sectional view illustrating an exemplary mobile phone handset.
Figure 24:
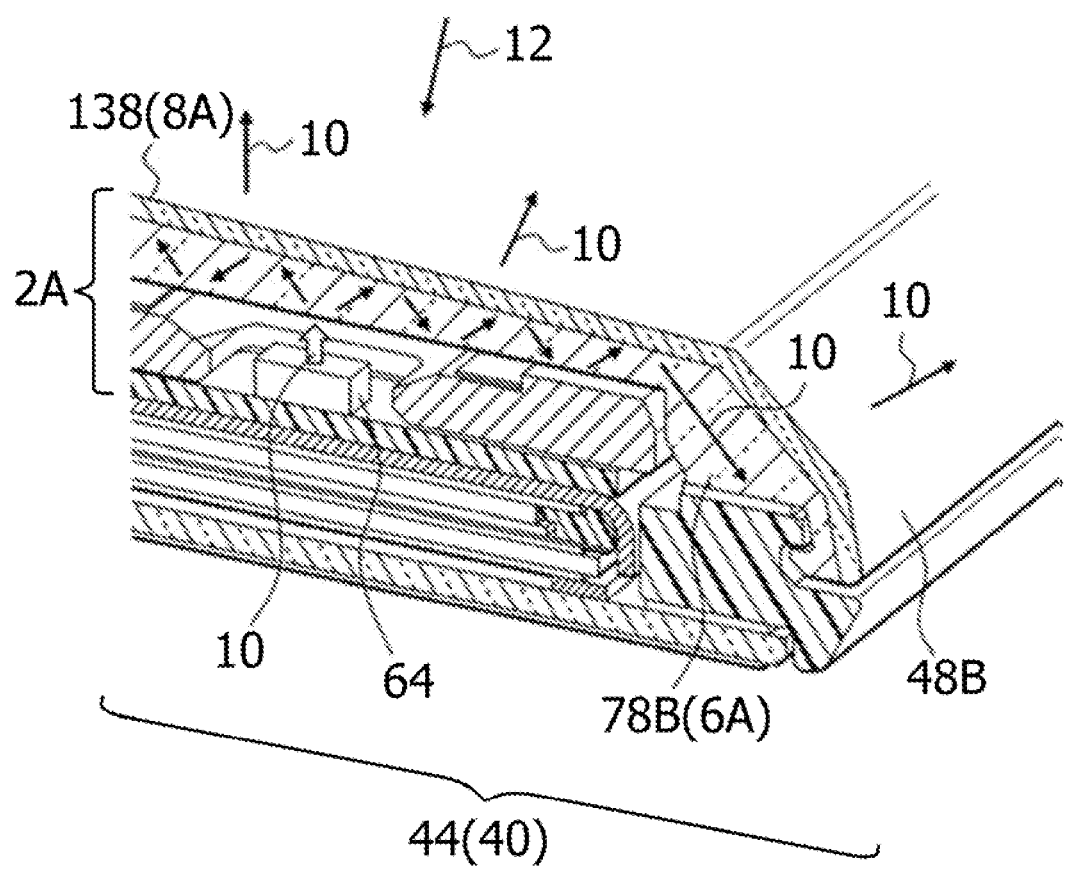
FIG. 24 is a perspective view illustrating how light is emitted.

In the sixth embodiment, the illumination unit 2A (i.e., the first embodiment) is provided in the face component of a mobile phone handset. The sixth embodiment will now be described with reference to FIGS. 23 and 24. In FIGS. 23 and 24, identical reference numbers are used for portions identical to those illustrated in FIG. 1 and FIGS. 5 to 18.

In the mobile phone handset 40 of the sixth embodiment, a case unit 48B is used. The case unit 48B may constitute the illumination unit 2A of the first embodiment described earlier (see FIG. 1). The case body unit 78B may correspond to the light guide-diffuser 6A described earlier (see FIG. 1). On the surface of the case body unit 78B, a half-mirror 138 is uniformly formed. The half-mirror 138 may be formed by coating or printing a half-mirror material onto the outer surface layer of a case body unit 78B formed from a transparent resin, for example. In the present embodiment, the illumination unit 2A is realized by LEDs 64 (which act as the light source) and the case unit 48B. Since other portions of the configuration are similar to those of the fourth embodiment, identical reference numbers are used in FIG. 23, and further description of such portions is herein omitted.

Given such a configuration, if the LEDs 64 are made to emit light, then as illustrated in FIG. 24, that light 10 enters the case body unit 78B and is diffused by being repeatedly refracted and reflected, thereby causing the case body unit 78B to emit light. The light emitted by the case body unit 78B passes through the half-mirror 138 and is presented at the surface of the case unit 48B, thereby generating illumination.

The case body unit 78B guides and diffuses the light 10, and emits light as a result. For this reason, efficient illumination can be realized while reducing the number of installed LEDs 64. Furthermore, uneven brightness and localized emission around the LEDs 64 can be effectively reduced or suppressed. Also, since the transmission of external light 12 is reduced or suppressed by the half-mirror 138, seeing through to the device internals can be prevented.

Seventh Embodiment

The seventh embodiment is a method for manufacturing the mobile phone handset 40 illustrated in the sixth embodiment (see FIGS. 23 and 24).

The seventh embodiment will now be described with reference to FIG. 25 and FIGS. 26A to 26C. It should be appreciated that the configuration illustrated in FIG. 25 and FIGS. 26A to 26C is merely one example, and that the present invention is not limited to such a configuration.

Figure 25:
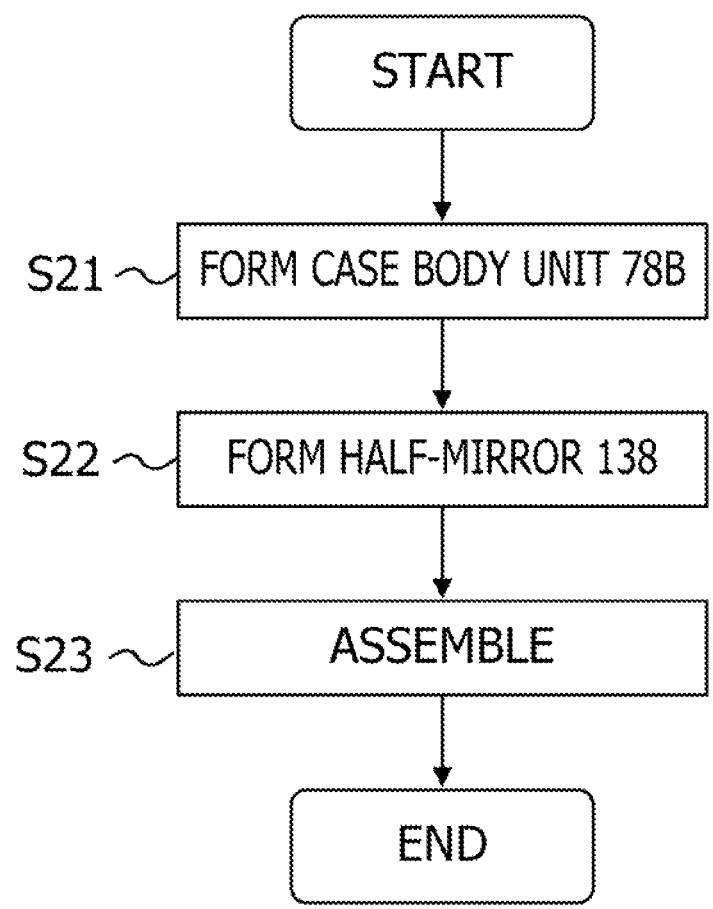
FIG. 25 is a flowchart illustrating an exemplary method for manufacturing a mobile phone handset.

As illustrated in FIG. 25, the manufacturing process includes the following steps: forming the case body unit 78B (S21); forming the half-mirror 138 (S22); and assembly (S23).

Figure 26A:
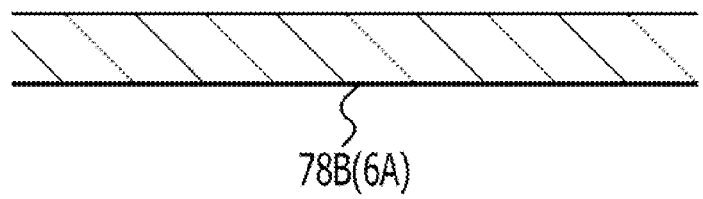
FIGS. 26A to 26C illustrate examples of processes in respective manufacturing steps.

FIG. 26A illustrates one example of forming the case body unit 78B (S21). In this step (S21), the case body unit 78B may be formed by molding a light guiding material. The light guiding material may be a transparent plastic, such as acrylic. This forming step may be similar to that of the fifth embodiment, and thus further description thereof is herein omitted.

Figure 26B:
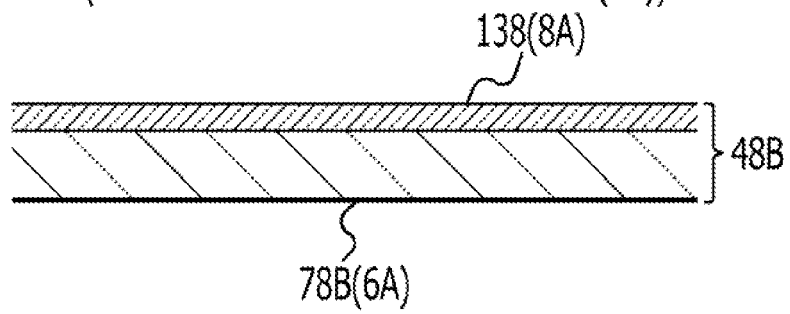

FIG. 26B illustrates one example of forming the half-mirror 138 (S22). In this step (S22), the half-mirror 138 is formed by coating or printing a half-mirror material onto the outer surface of the case body unit 78B. The half-mirror material may be any material that imparts light transmission properties to a reflective film. For example, a metal may be used. By coating, printing, or vapor depositing the half-mirror material, the half-mirror 138 is formed on the surface layer of the case body unit 78B. In so doing, the case unit 48B is obtained.

Figure 26C:
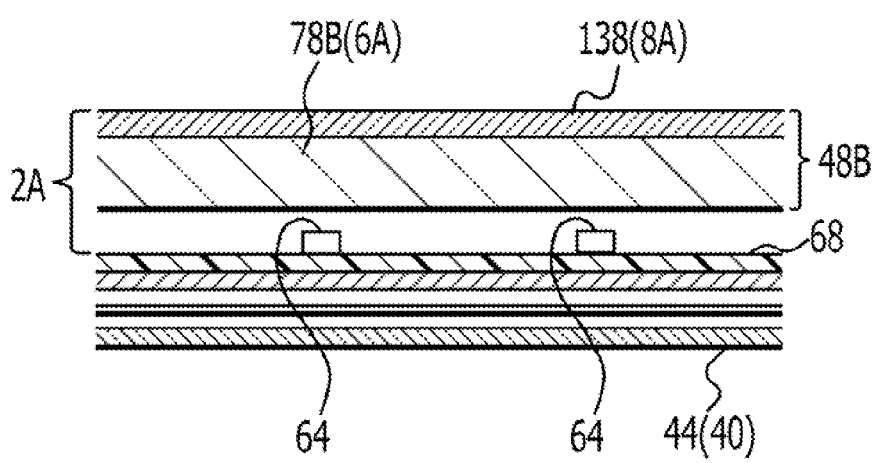

FIG. 26C illustrates one example of assembly (S23). In the assembly step, the case unit 48A is attached to the back of the display housing unit 44, and the mobile phone handset 40 is assembled. The circuit board 68 is installed in the display housing unit 44 in advance, with the LEDs 64 described earlier being installed onto the circuit board 68. In so doing, the illumination unit 2A is realized.

Via such assembly, the mobile phone handset 40 is manufactured. In the mobile phone handset 40, light is presented by the half-mirror 138 by the emission of light from the LEDs 64, the emission of light as a result of the guiding and diffusion of the case body unit 78B, and the light-transmitting properties of the half-mirror 138. In other words, illumination is realized as a result of this presentation of emitted light. In addition, according to this manufacturing method, the number and configuration of parts that constitute the illumination can be simplified, and manufacturing costs can be reduced.

Eighth Embodiment

In the eighth embodiment, the illumination unit 2C (i.e., the third embodiment) is provided in the face component of a mobile phone handset.

The eighth embodiment will now be described with reference to FIG. 27. FIG. 27 is an exploded perspective view illustrating a mobile phone handset. It should be appreciated that the configuration illustrated in FIG. 27 is merely one example, and that the present invention is not limited to such a configuration. In FIG. 27, identical reference numbers are used for portions identical to that illustrated in FIG. 7.

As illustrated in FIG. 27, a case unit 48C is used in the mobile phone handset 40 of the present embodiment. In the case unit 48C, a case body unit 78C and a face panel 146 are used. The face panel 146 may correspond to the area 50 described earlier. The case unit 48C may be constituted by affixing the face panel 146 to a face panel fixture 148 on the case body unit 78C. Even in the case where the case unit 48C is used, the mobile phone handset 40 can still be realized as illustrated in FIG. 5, and illumination can be similarly generated as illustrated in FIG. 6. Herein, the face panel 146 may also be detachably affixed to the case body unit 78C, and be able to be replaced as needed.

In addition, in the present embodiment, features such as the configuration of the circuit board 68 (see FIG. 8), the arrangement of the LEDs 64a, 64b, 64c, . . . , 64l, and the arrangement of the sub-display 62 are similar to those of the fourth embodiment.

(Case Body Unit 78C)

Figure 29:
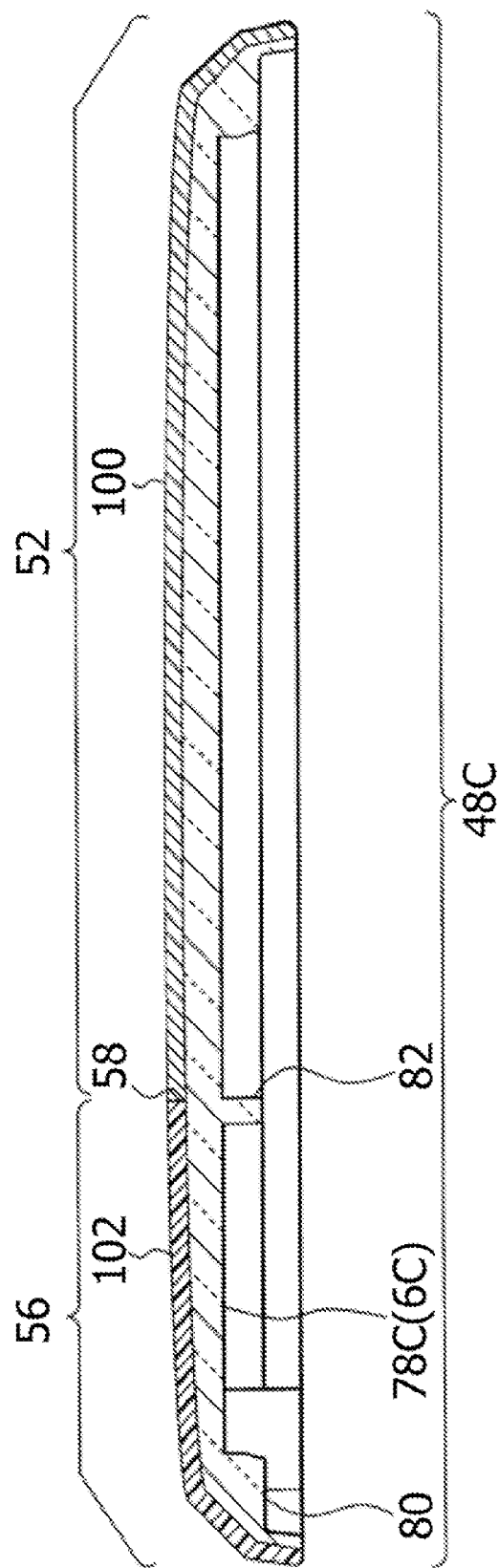
FIG. 29 is a cross-sectional view taken along the line XXIX in FIG. 27.

The case body unit 78C will now be described with reference to FIGS. 28 and 29. The area 50 of the case body unit 78C may constitute the light guide-diffuser 6C described earlier (see FIG. 4), and may be molded from transparent plastic, for example. As illustrated in FIG. 28, in the area 50, there is formed the face panel fixture 148 for affixing face panel 146. In addition, a semi-transparent unit 98 is formed on top of the case body unit 78C in the area 54.

The areas 52 and 56 will now be described with reference to FIG. 29. In the area 52, a semi-transparent unit 100 is formed on top of the case body unit 78C. In the area 56, a light-blocking unit 102 is formed. The semi-transparent unit 100 is a colored layer formed by, for example, vapor deposition or printing, similarly to the semi-transparent unit 98.

Besides the above, the configuration of the case unit 48C, including the case body unit 78C, may be similar to that of the fourth embodiment. For this reason, identical reference numbers are used, and further description is herein omitted.

(Face Panel 146)

Figure 30:
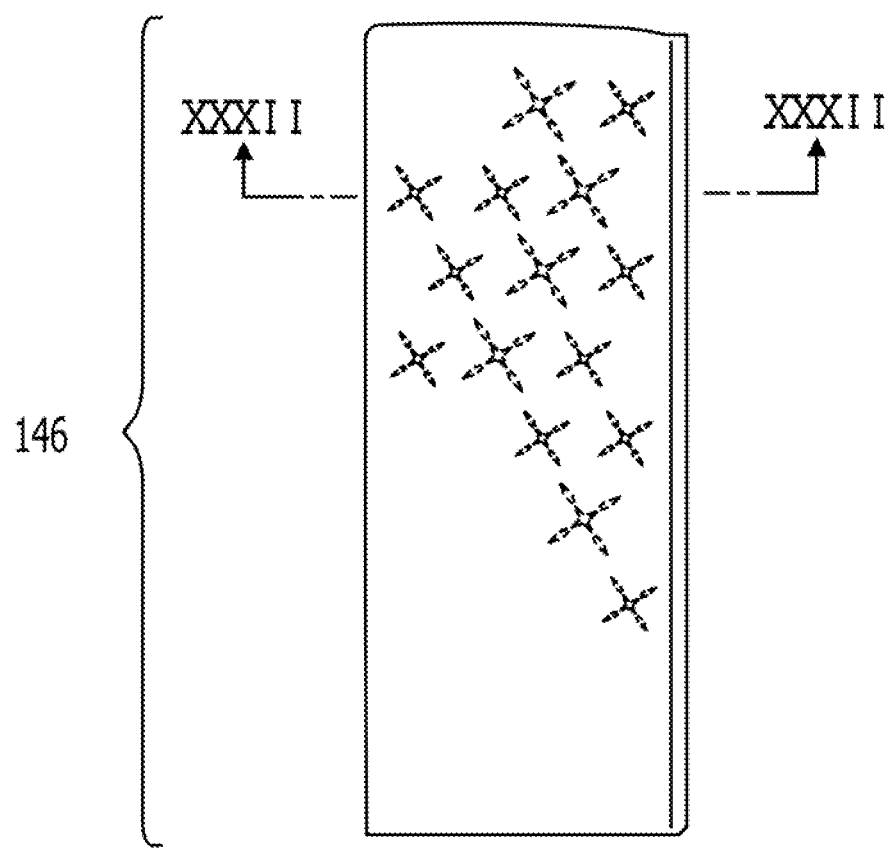
FIG. 30 illustrates a front view of an exemplary face panel.

The face panel 146 will now be described with reference to FIGS. 30, 31, and 32. The face panel 146 may be molded from transparent plastic, for example, and may correspond to the area 50 in the fourth embodiment. In other words, the face panel 146 is a unit independent from the case body unit 78C, and may correspond to the selective translucent unit 8C (see FIG. 4), the light guide component 15 (see FIG. 4), and the selective light shield 14B (see FIG. 4) that were described earlier.

Figure 32:
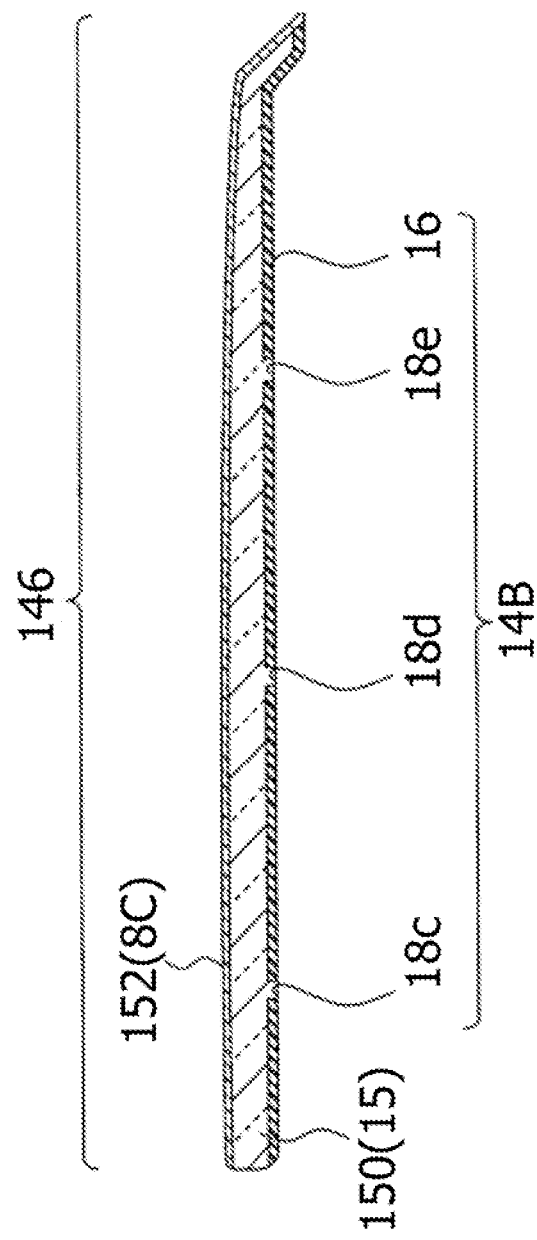
FIG. 32 is a cross-sectional taken along the line XXXII in FIG. 30.

As illustrated in FIG. 32, the face panel 146 is provided with a panel body unit 150, which forms the core of the face panel 146. The panel body unit 150 may correspond to the light guide component 15 (see FIG. 4). A half-mirror 152 is formed on the exterior of the panel body unit 150. The half-mirror 152 is one example of a mechanism for selectively transmitting light (i.e., the selective translucent unit 8C). The half-mirror 152 may be formed by vapor deposition of a half-mirror material with a black finish, for example.

Figure 31:
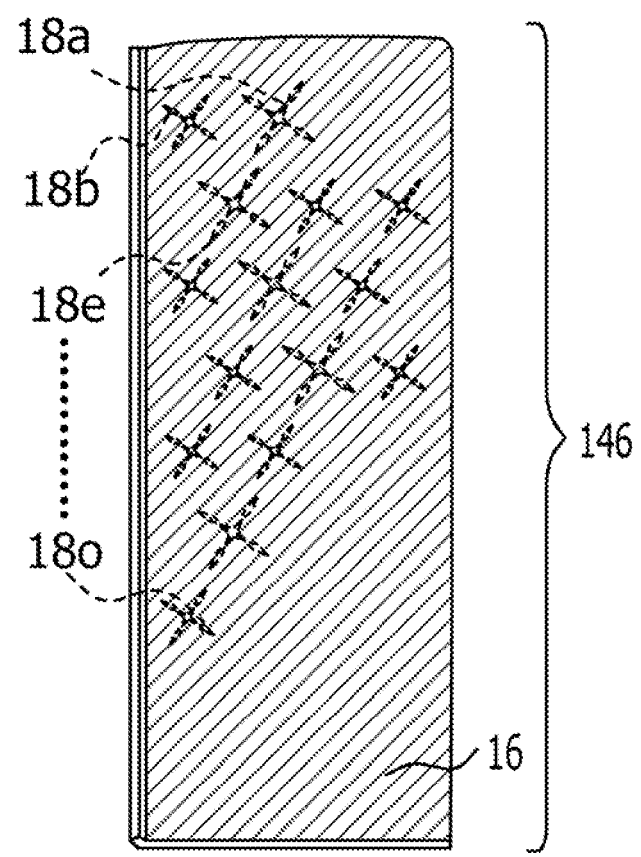
FIG. 31 illustrates a rear view of an exemplary face panel.

Also, as illustrated in FIGS. 31 and 32, a selective light shield 14B is formed on the back of the face panel 146. In the selective light shield 14B, the light transmitters 18a, 18b, 18c, . . . , 18o and the light blockers 16 that were described earlier are formed. The light transmitters 18a, 18b, 18c, . . . , 18o and the light blockers 16 may be formed by, for example, die-cut printing, coating, or vapor deposition.

(Illumination Unit 2C and Illumination Generation)

Figure 33:
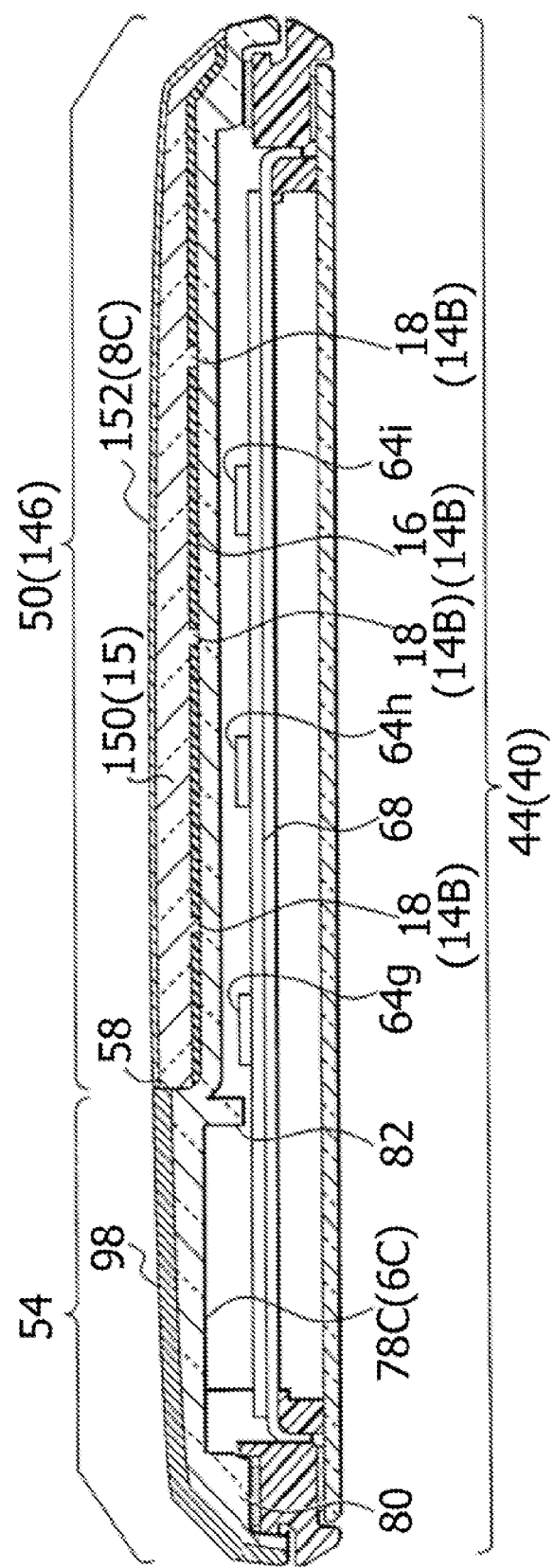
FIG. 33 is a cross-sectional view of an exemplary mobile phone handset.
Figure 34:
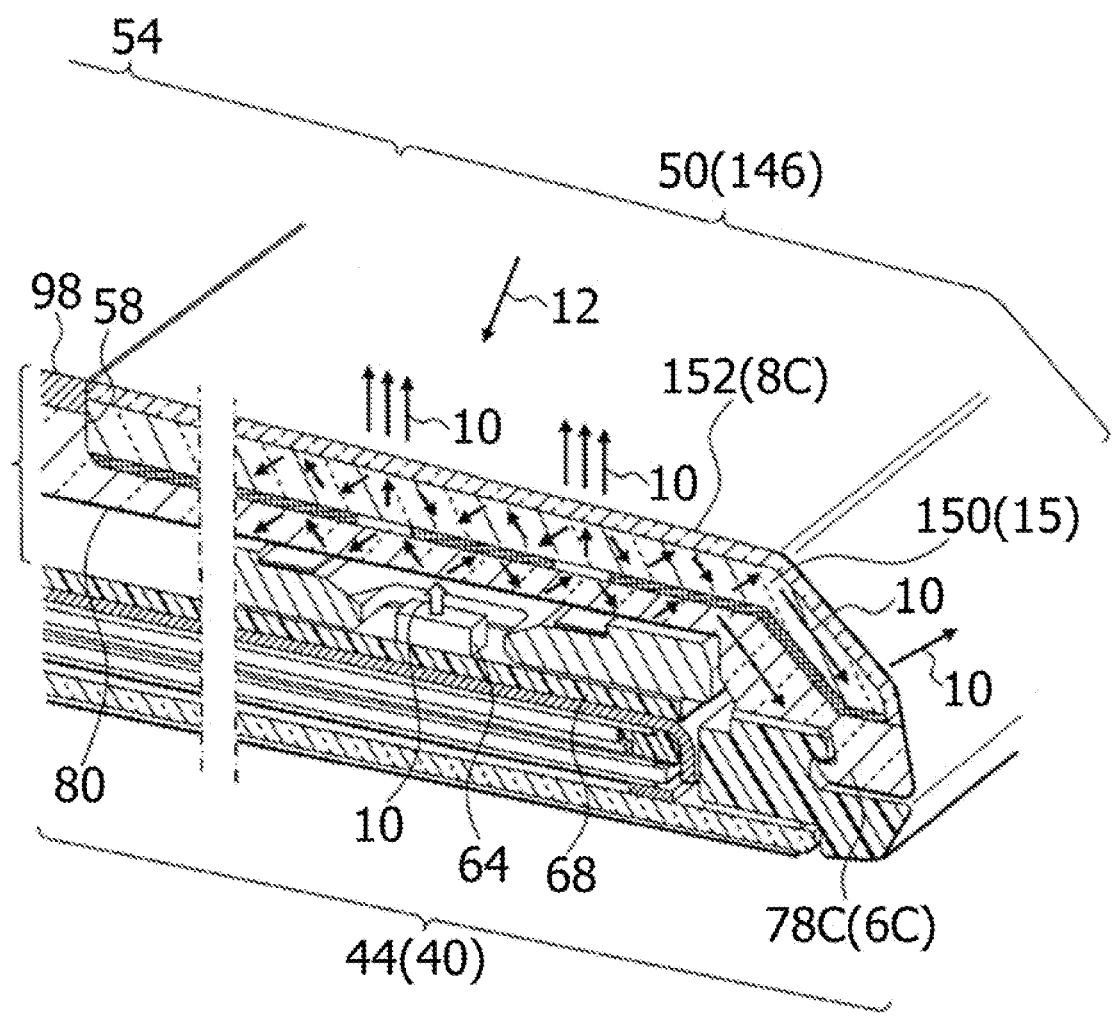
FIG. 34 is a perspective view illustrating how light is emitted.
Figure 35:
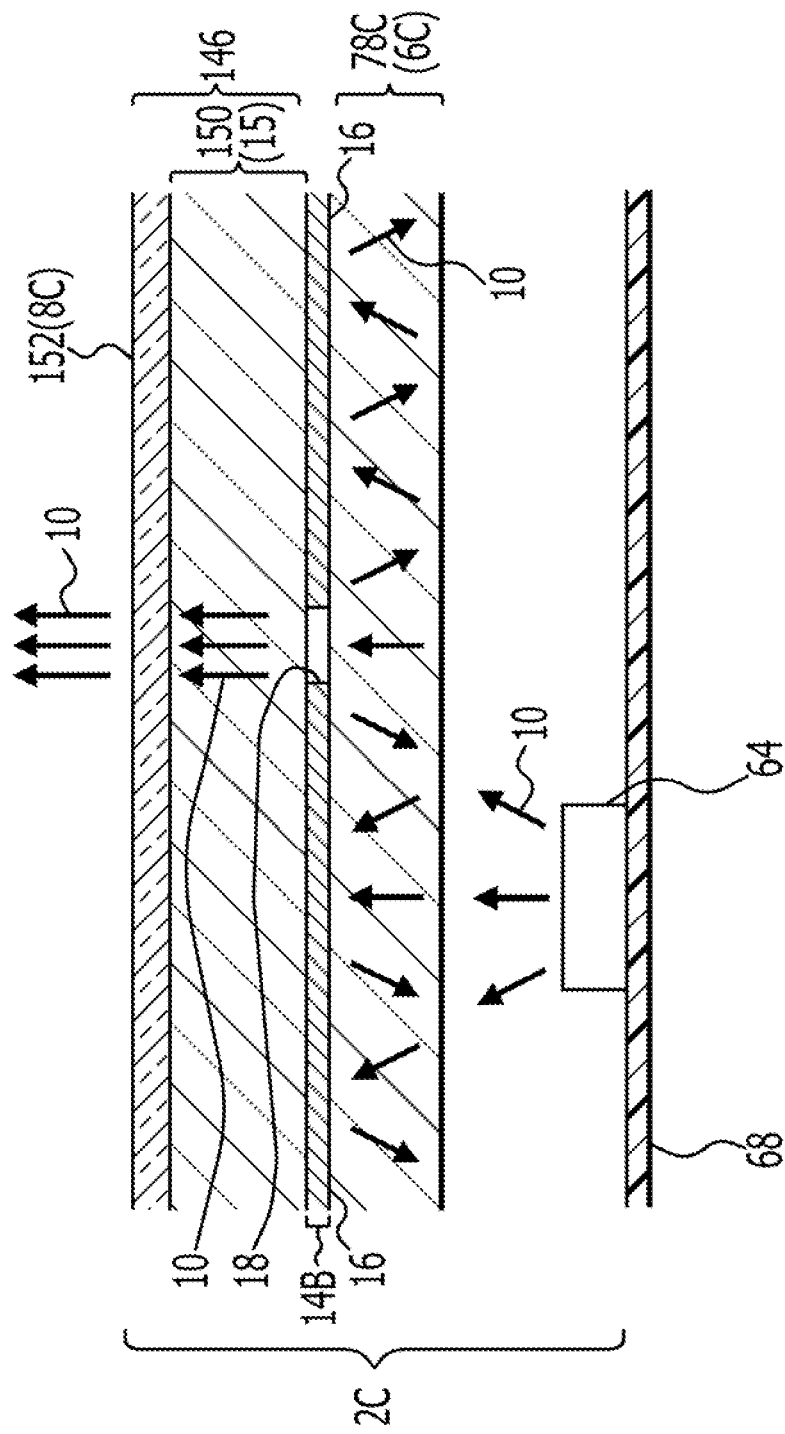
FIG. 35 illustrates the generation of illumination.

Next, the illumination unit and illumination generation will be described with reference to FIGS. 33, 34, and 35. The mobile phone handset 40 in the present embodiment is provided with case unit 48C described earlier, which is itself a combination of the case body unit 78C and the face panel 146. As illustrated in FIG. 33, the illumination unit 2C is realized. In the mobile phone handset 40 provided with such an illumination unit 2C, when the LEDs 64 emit light, that light 10 enters the case body unit 78C, as illustrated in FIG. 34.

The case body unit 78C may constitute the light guide-diffuser 6C (see FIG. 4). Thus, as illustrated in FIG. 35, the light 10 is guided and diffused while being repeatedly refracted and reflected, thereby causing the case body unit 78C to diffuse and emit light. Using this light emission, the light 10 is transmitted by the light transmitters 18a, 18b, 18c, . . . , 18o of the selective light shield 14B in the face panel 146, and blocked by the light blockers 16. In the face panel 146, the light 10 that is transmitted by the light transmitters 18a, 18b, 18c, . . . , 18o is guided by the panel body unit 150, and that light 10 is then presented by the half-mirror 152 (8C).

As a result, the silhouettes 20a, 20b, 20c, . . . , 20o (see FIG. 19) are presented at the surface of the half-mirror 152 (i.e., in the area 50) by the selective light shield 14B, and illumination is generated.

Similarly to the previous embodiments, the light 10 herein is guided and diffused by being repeatedly refracted and reflected, thereby causing the case body unit 78C to emit uniform light. The face panel 146 similarly emits uniform light, and thus the silhouettes 20a, 20b, 20c, . . . , 20o are presented at uniform brightness.

The hardware configuration of the mobile phone handset 40 in the present embodiment may be similar to that of the fourth embodiment (see FIG. 20). For this reason, further description thereof is herein omitted.

Ninth Embodiment

The ninth embodiment is a method for manufacturing the mobile phone handset 40 illustrated in the eighth embodiment (see FIGS. 27 to 35). The ninth embodiment will now be described with reference to FIG. 36 and FIGS. 37A to 37E. It should be appreciated that the configuration illustrated in FIG. 36 and FIGS. 37A to 37E is merely one example, and that the present invention is not limited to such a configuration.

Figure 36:
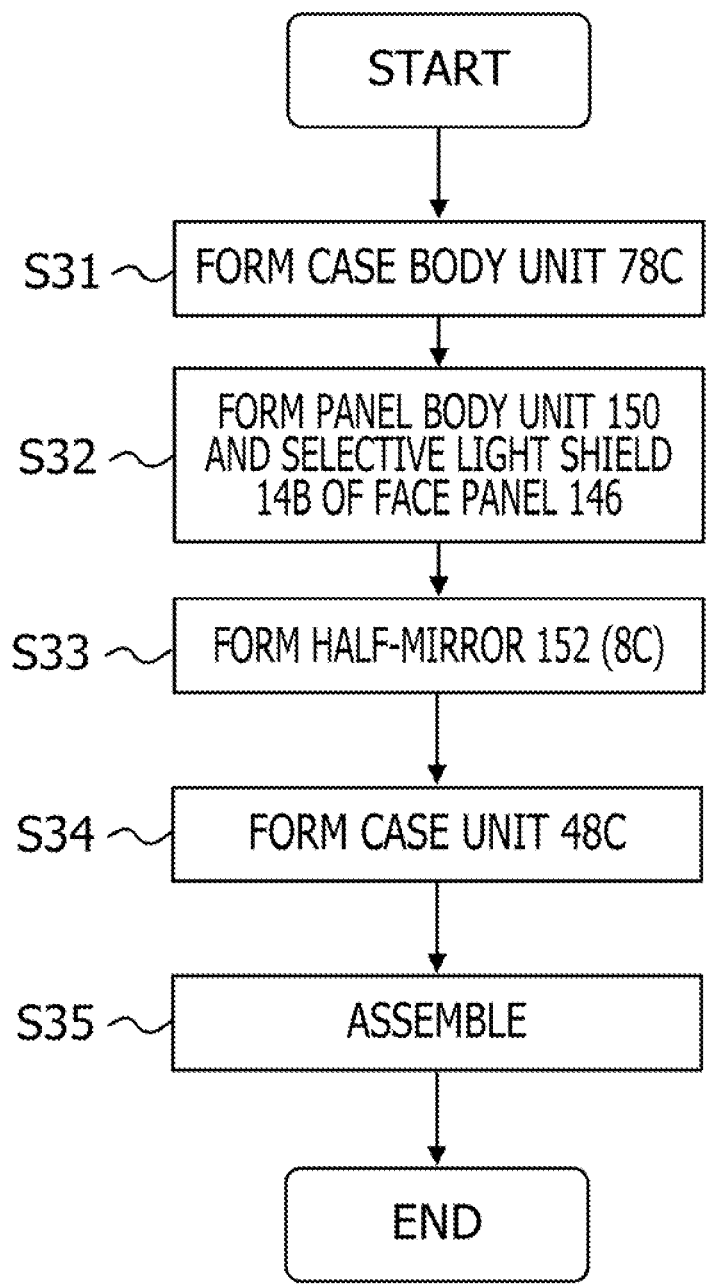
FIG. 36 is a flowchart illustrating an exemplary method for manufacturing a mobile phone handset.

As illustrated in FIG. 36, the manufacturing process includes the following steps: forming the case body unit 78C (S31); forming the panel body unit 150 and the selective light shield 14B of the face panel 146 (S32); forming the half-mirror 152 (S33); forming the case unit 48C (S34); and assembly (S35).

FIG. 37A illustrates one example of forming the case body unit 78C (S31). In this step (S31), the case body unit 78C may be formed by molding a light guiding material. The light guiding material may be a transparent plastic, such as acrylic. The case body unit 78C is formed by, for example, a single-piece molding process. Its shape is the same as that illustrated in FIG. 28. If a diffusing agent that diffuses light is mixed into the resin used as the light guiding material, then the light diffusing properties can be increased, and light can evenly emitted. In addition, a coloring agent can be mixed into the resin. By thus coloring the case body unit 78C, the color and intensity of the emitted light can be adjusted.

FIG. 37B illustrates one example of forming the forming the panel body unit 150 and the selective light shield 14B of the face panel 146 (S32). In this step (S32), the panel body unit 150 of the face panel 146 may be formed by molding a light guiding material. The light guiding material may be a transparent plastic, such as acrylic. The panel body unit 150 is formed by, for example, a single-piece molding process. Its shape is the same as that illustrated in FIGS. 30 and 32. In this case, if a diffusing agent that diffuses light is mixed into the resin used as the light guiding material, then the light diffusing properties can be increased, and light can evenly emitted. In addition, a coloring agent can be mixed into the resin. By thus coloring the panel body unit 150 of the face panel 146, the color and intensity of the emitted light can be adjusted.

In addition, the selective light shield 14B is formed on the back of the panel body unit 150. The light-blocking material of the selective light shield 14B may be any material having light-blocking properties, such as an opaque ink, an opaque paint, or a metal. The selective light shield 14B can be formed by printing in the case of an opaque ink, by coating in the case of an opaque paint, or by vapor deposition or a similar process in the case of a metal.

By forming the selective light shield 14B in this way, a plurality of light transmitters 18 and light blockers 16 are formed on the back of the face panel 146. The light transmitters 18 may correspond to the light transmitters 18a, 18b, 18c, . . . , 18o. In other words, light is transmitted by the light transmitters 18, and blocked by the light blockers 16. The formation of the selective light shield 14B is thus the process whereby the face panel 146 is granted light-selecting properties.

FIG. 37C illustrates one example of forming the half-mirror 152 (S33). In this step (S33), the half-mirror 152 is formed on the front of the face panel 146 using a transparent material. The half-mirror 152 reflects external light or reduces or suppresses the transmitting of external light. The half-mirror 152 is a layer that functions to transmit light guided by the face panel 146, and also constitutes a surface protecting layer. In the case where the half-mirror 152 is made to reflect external light while transmitting the light from the face panel 146, the half-mirror 152 may be formed by coating or printing a half-mirror material. If only light suppressing functions are sought, then a colored layer realized by printing or coating a colored paint may be provided instead of the half-mirror 152.

FIG. 37D illustrates one example of forming the case unit 48C (S34). In this step (S34), the case unit 48C is formed by joining the case body unit 78C with the face panel 146. Since a face panel fixture 148 (see FIG. 28) is formed on the case body unit 78C by molding, the case unit 48C may be obtained by affixing the face panel 146 to the face panel fixture 148.

FIG. 37E illustrates one example of assembly (S35). In the assembly step, the case unit 48C is attached to the back of the display housing unit 44, and the mobile phone handset 40 is assembled. The circuit board 68 is installed in the display housing unit 44 in advance, with the LEDs 64 described earlier being installed onto the circuit board 68. Each of the LEDs 64 is disposed in line with one of the light blockers 16. Herein, the LEDs 64 correspond to the LEDs 64a, 64b, 64c, . . . , 64l.

Via such assembly, the mobile phone handset 40 is manufactured. In the mobile phone handset 40, the silhouettes 20a, 20b, 20c, . . . , 20o described earlier can be presented to generate illumination by using the emission of light from the LEDs 64, as well as the light-selecting properties of the light transmitters 18 and the light blockers 16 in the selective light shield 14B of the case unit 48C. In addition, according to this manufacturing method, the number and configuration of parts that constitute the illumination can be simplified, and manufacturing costs can be reduced.

Figure 38:
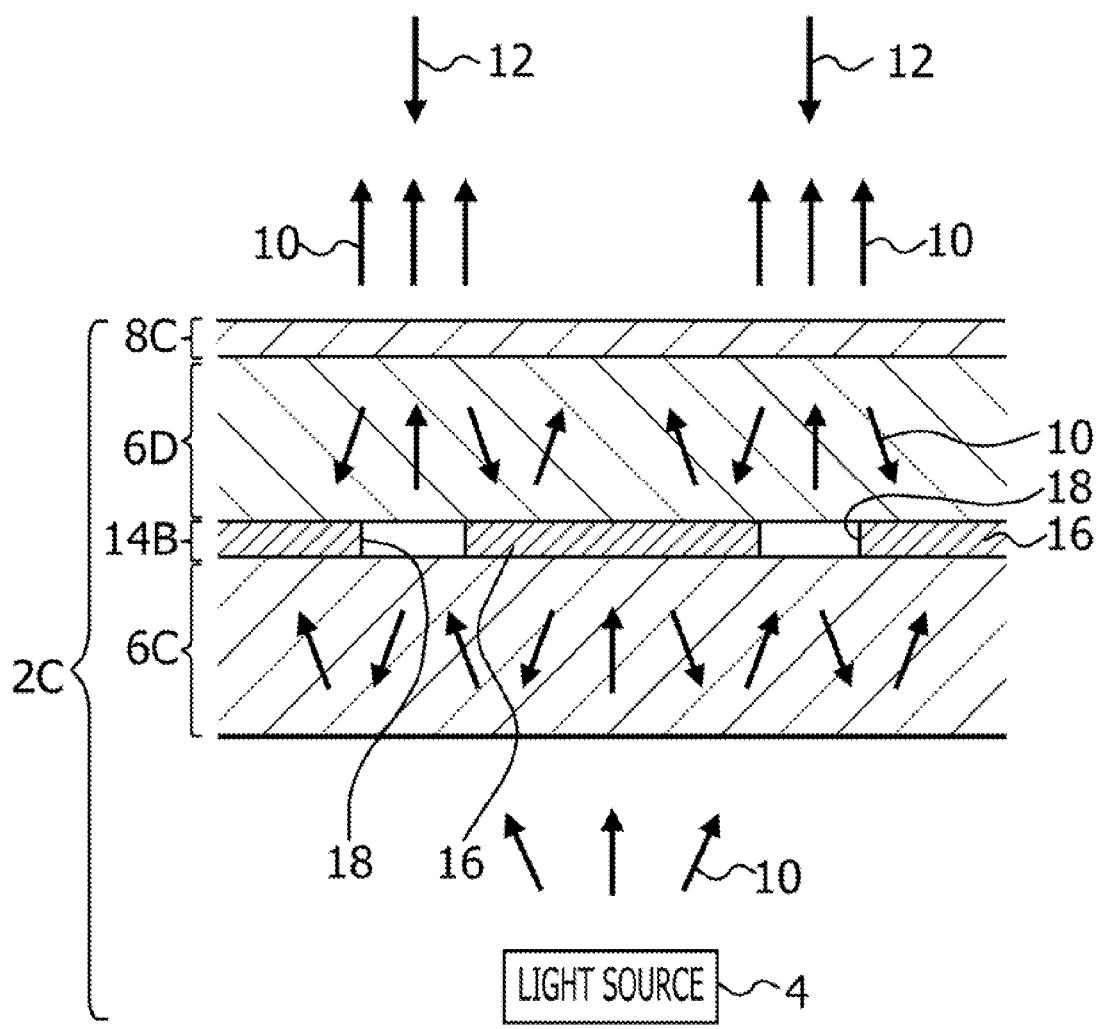
FIG. 38 illustrates an exemplary illumination unit.

Other Embodiments (1) In a foregoing embodiment (see FIG. 4), the light guide component 15 is disposed between the selective translucent unit 8C and the selective light shield 14B. However, as illustrated in FIG. 38, a light guide-diffuser 6D may be installed instead of the light guide component 15. In this case, light transmitted by the selective light shield 14B can be guided and diffused by the light guide-diffuser 6D, and presented by the selective translucent unit 8C.

Figure 39:
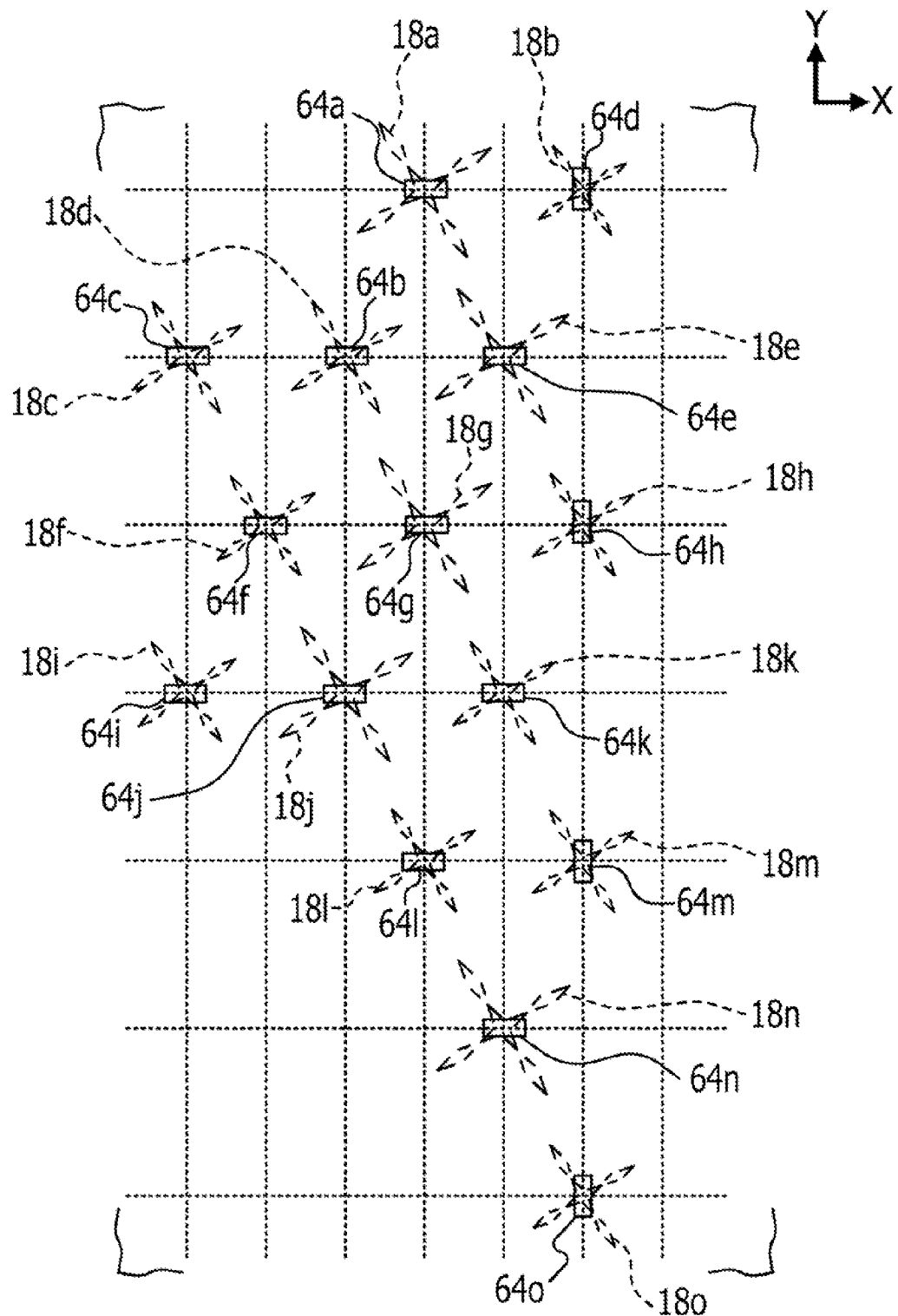
FIG. 39 illustrates an exemplary modification of the relative positions of an LED and a translucent unit.

(2) In the foregoing embodiments, the LEDs 64a, 64b, 64c, . . . , 64l and the light transmitters 18a, 18b, 18c, . . . , 18o are set at different positions. However, the above components are not limited to being at different positions. For example, as illustrated in FIG. 39, the positions of the LEDs 64a, 64b, 64c, . . . , 64l and the light transmitters 18a, 18b, 18c, . . . , 18o may be identical. In other words, the LEDs may be arranged in line with the light transmitters 18. Even when configured this way, the light guide-diffusers 6A, 6B, and 6C are disposed, and thus the light transmitted by the light transmitters 18a, 18b, 18c, . . . , 18o can be equalized by light diffusion and emission. For this reason, the silhouettes 20a, 20b, 20c, . . . , 20o can be presented with evenly emitted light.

Figure 40:
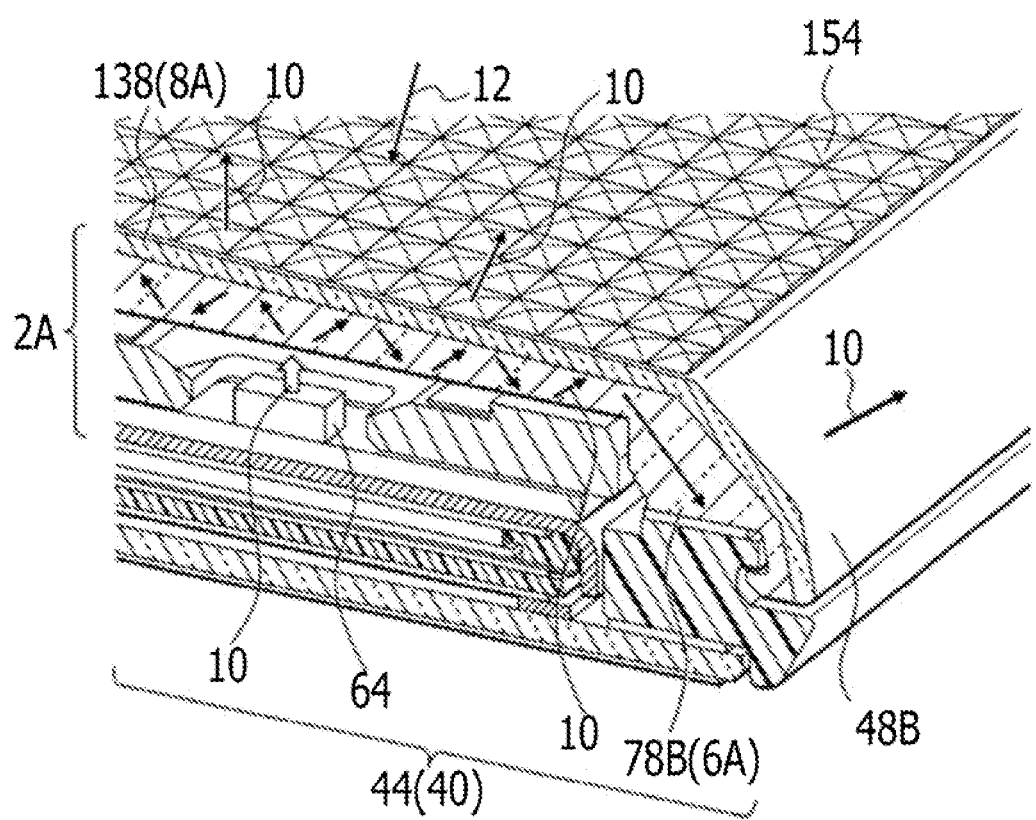
FIG. 40 illustrates an exemplary mobile phone handset.

(3) In the foregoing embodiments, the case units 48A, 48B, and 48C, as well as the face panel 146 (i.e., a part of the case unit 48C) are taken to have flat external surfaces. However, the above components are not limited to such flat surfaces. For example, as illustrated in FIG. 40, a regular indented surface 154 may be formed on the case unit 48B and configured to diffuse light by light refraction and reflection. Alternatively, a light guide-diffuser panel having such an indented surface 154 may be provided. By configuring a device in this way, ornamental quality of the illumination is increased, and the amount of variation in the illumination can be expanded.

(4) In the foregoing embodiments, a mobile phone handset 40 is given by way of example as a device provided with an illumination unit. However, it should be appreciated that the illumination unit, device, and manufacturing method disclosed herein are not limited to such a mobile device. The illumination unit, device, and manufacturing method disclosed herein may be applied to a variety of devices, such as a personal computer (PC) 200 (see FIGS. 41 and 42) or a personal digital assistant (PDA) 300 (see FIG. 43).

Figure 41:
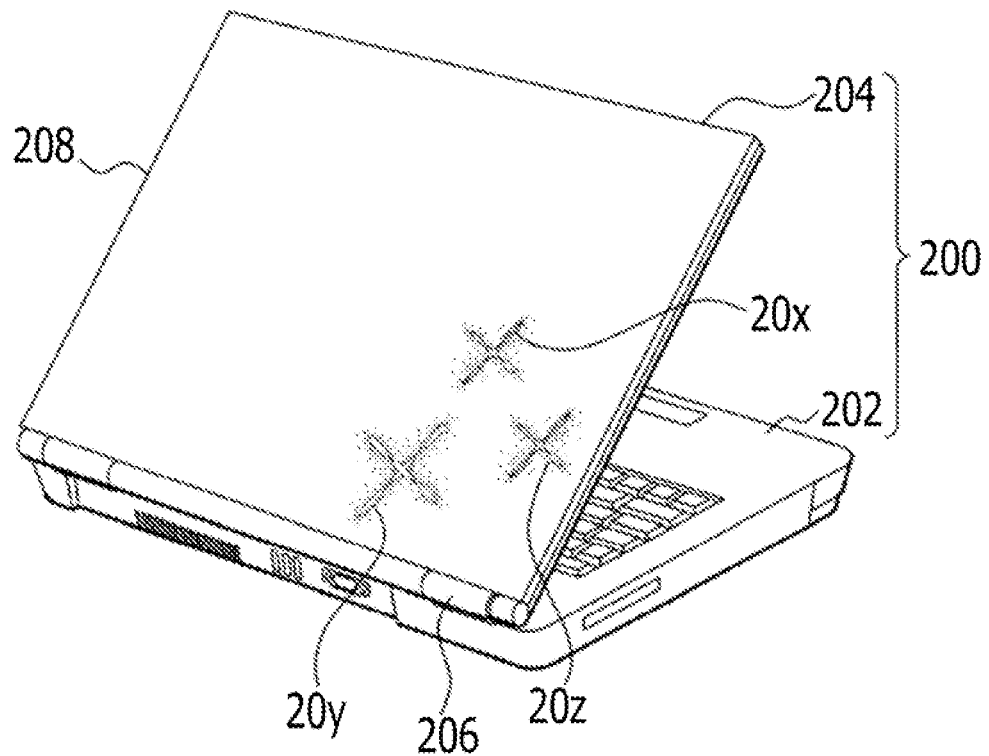
FIG. 41 illustrates an exemplary personal computer.

(5) As illustrated in FIG. 41, the PC 200 is provided with a keyboard housing unit 202 and a display housing unit 204, which can be opened and closed by a hinge 206. In the display housing unit 204, silhouettes 20x, 20y, and 20z as described earlier are presented, and illumination is generated.

Figure 42:
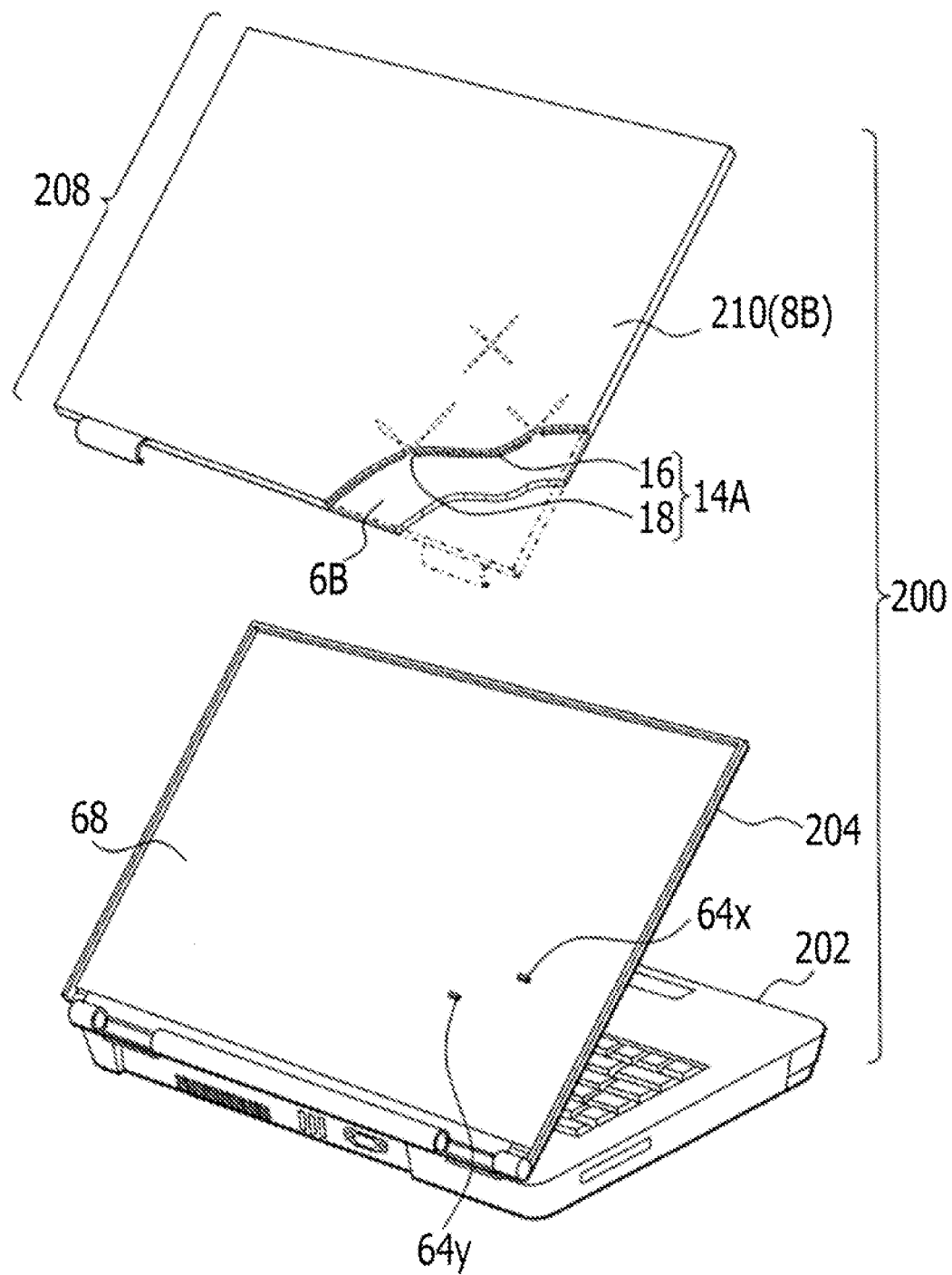
FIG. 42 illustrates a partially cut-away case.

In this case, as illustrated in FIG. 42, the light guide-diffuser 6B described earlier is used as the base material of the case unit 208 of the PC 200. On the surface of the case unit 208, the selective light shield 14A is disposed. On the surface of the selective light shield 14A, a half-mirror 210 (i.e., the selective translucent unit 8B) is formed. In the selective light shield 14A, there are formed light blockers 16 and light transmitters 18, with LEDs 64x and 64y being disposed on a circuit board 68 in the display housing unit 204.

In this way, the illumination unit 2B can be similarly realized in the PC 200. Moreover, the illumination units 2A and 2C described earlier may also be realized. Consequently, if the LEDs 64x and 64y are made to emit light, then silhouettes 20x, 20y, and 20z of that light can be presented by the guiding and diffusing functions of the light guide-diffuser 6B, and by the transmitting and blocking functions of the selective light shield 14A. In so doing, illumination can be realized.

Figure 43:
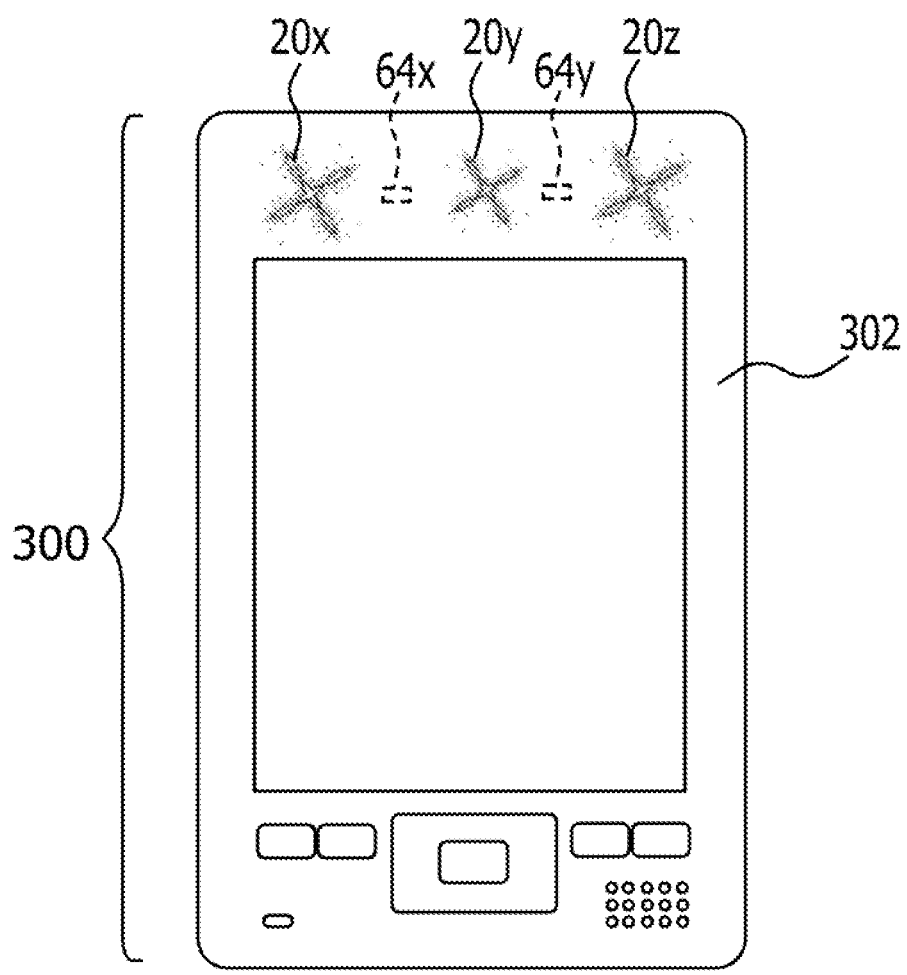
FIG. 43 illustrates an exemplary personal digital assistant.

(6) Furthermore, the illumination units 2A, 2B, and 2C described earlier may also be realized in a PDA 300. For example, according to the illumination unit 2B or 2C, silhouettes 20x, 20y, and 20z can be presented by the half-mirror of a front panel 302, as illustrated in FIG. 43. In so doing, illumination can be realized.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An illumination unit, comprising:
   a light source;
   a light guide-diffuser that diffuses and emits source light from the light source;
   a light shield including light blockers and light transmitters, the light transmitters being between the light blockers and allowing emitted light to pass therethrough;
   a selective translucent unit that reflects external light or reduces the transmission of external light, while also transmitting the source light emitted from the light guide-diffuser that has passed through the light transmitters; and
   a presentation surface that presents the source light that has been emitted from the light guide-diffuser and transmitted through the selective translucent unit, wherein
   the light source is arranged between adjacent light transmitters, wherein
   the selective translucent unit comprises a half-mirror that reflects external light and transmits the source light emitted from the light guide-diffuser.

2. The illumination unit according to claim 1, wherein
   the presentation surface is capable of presenting a silhouette formed by transmission of the source light or blocking of the source light by the light shield.

3. The illumination unit according to claim 1, further comprising:
   a light guide component, disposed between the light shield and the selective translucent unit, that guides the source light emitted by the light shield to the selective translucent unit.

4. The illumination unit according to claim 1, wherein
   the light source is arranged in line with the light blockers of the light shield.

5. A device, comprising:
   a light source;
   a light guide-diffuser that diffuses and emits source light from the light source;

a light shield including light blockers and light transmitters, the light transmitters being between the light blockers and allowing emitted light to pass therethrough;

a selective translucent unit that reflects external light or reduces the transmission of external light, while also transmitting the source light emitted from the light guide-diffuser that has passed through the light transmitters; and a surface that presents the source light that has been emitted from the light guide-diffuser and transmitted by the selective translucent unit, wherein the light source is arranged between adjacent light transmitters, wherein the selective translucent unit comprises a half-mirror that reflects external light and transmits the source light emitted from the light guide-diffuser.

6. A method of manufacturing a device, comprising:

forming a light guide-diffuser that diffuses and emits source light from a light source;

providing a light shield including light blockers and light transmitters, the light transmitters being between the light blockers and allowing emitted light to pass therethrough; and forming a selective translucent unit that reflects external light or reduces the transmission of external light, while also transmitting the source light emitted from the light guide-diffuser that has passed through the light transmitters, wherein the light source is arranged between adjacent light transmitters, and the selective translucent unit comprises a half-mirror that reflects external light and transmits the source light emitted from the light guide-diffuser.

7. The method of manufacturing a device according to claim 6, wherein the light shield selectively emits or blocks the emitted source light from the light guide-diffuser.

8. The method of manufacturing a device according to claim 7, further comprising:

forming a light guide component, disposed between the selective light shield and the selective translucent unit, that guides the source light emitted by the light shield to the selective translucent unit.

9. The method of manufacturing a device according to claim 6, further comprising:

positioning the selective translucent unit opposite the light guide-diffuser and to cover an external surface of the device.

\* \* \* \* \*